United States Patent
Banu et al.

(10) Patent No.: US 8,873,690 B2
(45) Date of Patent: Oct. 28, 2014

(54) METHOD AND SYSTEM FOR MULTI-POINT SIGNAL GENERATION WITH PHASE SYNCHRONIZED LOCAL CARRIERS

(71) Applicant: Blue Danube Labs, Inc., New Providence, NJ (US)

(72) Inventors: Mihai Banu, New Providence, NJ (US); Vladimir Ivanov Prodanov, San Luis Obispo, CA (US)

(73) Assignee: Blue Danube Labs, Inc., New Providence, NJ (US)

( * ) Notice: Subject to any disclaimer, the term of this patent is extended or adjusted under 35 U.S.C. 154(b) by 0 days.

(21) Appl. No.: 14/049,094

(22) Filed: Oct. 8, 2013

(65) Prior Publication Data

US 2014/0037034 A1    Feb. 6, 2014

Related U.S. Application Data

(63) Continuation of application No. 13/565,557, filed on Aug. 2, 2012, now Pat. No. 8,553,826, which is a continuation of application No. 12/176,897, filed on Jul. 21, 2008, now Pat. No. 8,259,884.

(60) Provisional application No. 60/961,367, filed on Jul. 20, 2007.

(51) Int. Cl.
 *H04L 7/00* (2006.01)
 *H04L 7/02* (2006.01)
 *H04B 15/02* (2006.01)
 *G06F 1/12* (2006.01)

(52) U.S. Cl.
 CPC ............ *H04L 7/02* (2013.01); *H04B 2215/067* (2013.01); *H04B 15/02* (2013.01); *G06F 1/12* (2013.01)

USPC .............................. 375/356; 327/141; 331/57

(58) Field of Classification Search
 CPC .................................. G06F 1/10; H04J 3/0685
 See application file for complete search history.

(56) References Cited

U.S. PATENT DOCUMENTS

| | | | |
|---|---|---|---|
| 4,247,817 A | 1/1981 | Heller | |
| 4,998,262 A | 3/1991 | Wiggers | |
| 5,243,703 A | 9/1993 | Farmwald et al. | |
| 5,361,277 A | 11/1994 | Grover | |
| 5,432,823 A | 7/1995 | Gasbarro et al. | |
| 5,528,187 A | 6/1996 | Sato et al. | |
| 5,602,877 A | 2/1997 | Boccuzzi et al. | |

(Continued)

FOREIGN PATENT DOCUMENTS

| | | |
|---|---|---|
| EP | 0422373 A2 | 4/1991 |
| EP | 1294116 A2 | 3/2003 |

(Continued)

OTHER PUBLICATIONS

International Search Report for PCT/US08/070649, mailed Jan. 22, 2009, 3 pages.

(Continued)

*Primary Examiner* — Leon-Viet Nguyen
(74) *Attorney, Agent, or Firm* — Wilmer Cutler Pickering Hale and Dorr LLP

(57) ABSTRACT

A method and system of applying modulated carrier signals to tree networks and processing signals tapped from the tree networks to generate output signals with phase-synchronized carriers are disclosed.

35 Claims, 37 Drawing Sheets

(56) References Cited

U.S. PATENT DOCUMENTS

| | | | |
|---|---|---|---|
| 5,657,481 | A | 8/1997 | Farmwald et al. |
| 5,696,951 | A | 12/1997 | Miller |
| 5,712,882 | A | 1/1998 | Miller |
| 5,712,883 | A | 1/1998 | Miller et al. |
| 5,734,685 | A | 3/1998 | Bedell et al. |
| 6,150,866 | A | 11/2000 | Eto et al. |
| 6,323,716 | B1 | 11/2001 | Sakamoto |
| 6,400,230 | B2 | 6/2002 | Fairbanks |
| 6,531,358 | B1 | 3/2003 | Yu |
| 7,035,269 | B2 | 4/2006 | Rolston et al. |
| 7,043,651 | B2 | 5/2006 | Aweya et al. |
| 8,259,884 | B2 * | 9/2012 | Banu et al. .................. 375/356 |
| 8,553,826 | B2 * | 10/2013 | Banu et al. .................. 375/356 |
| 2004/0127922 | A1 | 7/2004 | Cull et al. |
| 2004/0232956 | A1 | 11/2004 | Nguyen et al. |

FOREIGN PATENT DOCUMENTS

| | | |
|---|---|---|
| WO | WO-9318463 A1 | 9/1993 |
| WO | WO-9725664 A1 | 7/1997 |
| WO | WO-9725795 A1 | 7/1997 |
| WO | WO-9725796 A1 | 7/1997 |
| WO | WO-9725797 A1 | 7/1997 |

OTHER PUBLICATIONS

Notification of Transmittal of the International Search Report for PCT/US08/070649, mailed Jan. 9, 2009, 4 pages.

NRAO, "A Proposal for a Very Large Array Radio Telescope", vol. II, National Radio Astronomy Observatory, Green Bank, West Virginia, Ch. 14, 1967, 41 pages.

Thompson, A.R. Moran, J.M., and Swenson, G.W., Jr. Interferometry and Syntesis in Radio Astronomy. Joh Wlley and Sons, New York; 1986; pp. 180-209.

Written Opinion of the International Searching Authority for PCT/US08/070649, mailed Jan. 22, 2009, 5 pages.

Badaroglu, M. et al., "Digital Ground Bounce Reduction by Phase Modulation of the Clock," Proc. Design, Automat. and Test in Europe Conf. and Ex., (2004) (6 pages).

European Search Report issued for European Appl. No. 08796379.9, dated Feb. 6, 2012 (4 pages).

International Search Report issued for PCT/US2011/042527, dated Nov. 10, 2011 (2 pages).

Parker, D. and Zimmermann, D. "Phased Arrays—Part I: Theory and Architectures," IEEE Trans. Microwave Theory and Techniques, vol. 50, Mar. 2002 (10 pages).

Parker, D. and Zimmermann, D. "Phased Arrays—Part II: Implementations, Applications, and Future Trends," IEEE Trans. Microwave Theory and Techniques, vol. 50, Mar. 2002 (11 pages).

Prodanov, V. and Banu, M. "GHz Serial Passive Clock Distribution in VLSI Using Bidirectional Signaling," Proceedings, 2006 IEEE Custom Integrated Circuits Conference (4 pages).

Thompson, A.R. et al., "Design of the Analog Receiving System," Interferometry and Synthesis in Radio Astronomy, (22 pages) (2001).

* cited by examiner

FIGURE 33

METHOD AND SYSTEM FOR MULTI-POINT SIGNAL GENERATION WITH PHASE SYNCHRONIZED LOCAL CARRIERS

CROSS REFERENCE TO RELATED APPLICATIONS

This application is a continuation of U.S. patent application Ser. No. 13/565,557, filed Aug. 2, 2012, which is a continuation of U.S. patent application Ser. No. 12/176,897, filed Jul. 21, 2008, which claims priority to U.S. Provisional Application No. 60/961,367, filed Jul. 20, 2007, each of which is incorporated herein by reference in its entirety.

BACKGROUND OF THE INVENTION

1. Field of the Invention

Embodiments of the present invention generally relate to analog and digital signal distribution/synchronization methods and systems and in particular to the distribution of a modulated signal in a coherent system to achieve carrier phase/frequency synchronization at the distribution points.

2. Description of the Related Art

Many analog and digital systems and subsystems used in communications, computing, data processing, military, and other applications (collectively hereinafter referred to as "coherent systems") are designed to operate synchronously. Typical coherent systems comprise subsystems capable of generating and transmitting signals such as electronic, electrical, mechanical, optical, or sonar subsystems. An example of an electronic coherent system is the massive set of logic gates present in modern digital systems or subsystems. These gates switch according to an absolute clock beat, which is provided by properly generated or distributed clock signals. Typically, the local clock signals are distributed from a master clock source. In order to reduce system level EMI (electromagnetic interference), this clock signal is sometimes modulated with low frequency signals or noise. For example, this technique is often used in VLSI systems. In such a case, the distributed "clock" signal is a phase-modulated carrier, which is non-periodic, albeit with approximately periodic shape over short time intervals. The distribution network must guarantee accurate carrier synchronization such that all logic is clocked properly from clock beat to clock beat, even though in the long run the phase of the clock signal wanders around an average absolute value.

In addition to digital applications, there are many analog, RF, and mixed-signal systems, which require time synchronization of modulated signals. For example, active arrays, such as phased-array radars or electronic steering antennas rely on precise carrier phasing of RF signals. The distribution of these modulated signals is similar in concept to the clock distribution in digital systems.

A typical signal distribution network with phased aligned outputs is built hierarchically using a tree topology, starting with a master generator connected to a tree trunk to which branches are attached, followed by other branches, etc. until the final signal delivery points are reached on top of the tree. If the distribution network is electrically small for the carrier frequency used, i.e., if the signal propagation times from the generator to any of the final delivery points are small compared to the carrier period, the tree network as described without any additional constraints is adequate. However, in most modern applications, the carrier frequencies are so high (e.g., on the order of GHz) that even miniaturized systems, such as fully integrated circuits, are not electrically small. In such cases, the design of the distribution network providing accurate synchronization may become extremely challenging.

A known approach to signal distribution in electrically-large systems is based on the "equal time-of-flight" principle. The distribution network is designed such that the time necessary for a signal to propagate from the master generator to all delivery points at the top of the tree is a constant. The RF corporate feed network or the VLSI H-tree clocking network are typical examples implementing this principle. This approach is the de facto "work horse" of signal distribution/synchronization but suffers from well-documented practical limitations: stringent geometrical constraints, power hungry, susceptibility to noise, and susceptibility to timing errors known as skew. Often, expensive additional techniques are employed to contain these shortcomings. In the case of active distribution trees, such as those used in VLSI clocking, operation at frequencies above a few GHz is rather difficult to attain. Recently, serial clock distribution over wave guides has been proposed, motivated by improved theoretical performance in power dissipation, noise and cost. For example, see Wayne D Grover "Method and Apparatus for Clock Distribution and for Distributed Clock Synchronization," U.S. Pat. No. 5,361,277, Nov. 1, 1994; Michael Farmwald and Mark Horowitz, "Apparatus for Synchronously Generating Clock Signals in a Data Processing System" U.S. Pat. No. 5,243,703, Sep. 7, 1993; Charles D. Miller "Signals Distribution System" U.S. Pat. No. 5,712,882, Jan. 27, 1998; NRAO, A Proposal for a Very Large Array Radio Telescope, Vol. II, National Radio Astronomy Observatory, Green Bank, West Va., Ch. 14, 1967; Richard R Goulette "Technique for Distributing Common Phase Clock Signals" U.S. Pat. No. 6,531,358 B1, May 13, 2003; and V. Prodanov and M. Banu "GHz Serial Passive Clock Distribution in VLSI Using Bidirectional Signaling," Proceedings, 2006 IEEE Custom Integrated Circuits Conference. The inherent skew accumulation due to serial transmission is mitigated by time averaging two signals propagating in opposite directions. The main fundamental shortcomings of this technique are a) the large total length of the waveguides, possibly resulting in signal loss and dispersion, and b) the limited practical precision of the known time averaging circuits. In addition, these methods were intended for distribution of periodic, not modulated, signals.

A first class of previously proposed serial clock distribution schemes: See Wayne D. Grover "Method and Apparatus for Clock Distribution and for Distributed Clock Synchronization" U.S. Pat. No. 5,361,277, Nov. 1, 1994; Michael Farmwald and Mark Horowitz, "Apparatus for Synchronously Generating Clock Signals in a Data Processing System" U.S. Pat. No. 5,243,703, Sep. 7, 1993; and Charles D. Miller "Signals Distribution System" U.S. Pat. No. 5,712,882, Jan. 27, 1998, uses electrical pulse signaling over transmission lines. For these techniques, any pulse dispersion introduces timing errors, which increase as the pulses travel farther and farther away from the generators. The theoretical possibilities to avoid these errors at high frequencies are either to use extremely good, low-dispersion transmission lines, or to keep the total length of the transmission lines short. The first option increases the system cost and the second option reduces the number of useful applications. Applying this approach with high speed optical pulses transmitted over optical waveguides should provide significantly lower dispersion but such systems would require additional error-prone functionality related to optical-to-electrical conversion.

A second class of proposed serial clock distribution schemes, see NRAO, A Proposal for a Very Large Array Radio Telescope, Vol. II, National Radio Astronomy Observatory, Green Bank, West Va., Ch. 14, 1967; Richard R Goulette "Technique for Distributing Common Phase Clock Signals" U.S. Pat. No. 6,531,358 B1, May 13, 2003; and V. Prodanov and M. Banu "GHz Serial Passive Clock Distribution in VLSI Using Bidirectional Signaling," Proceedings, 2006 IEEE Custom Integrated Circuits Conference, use electrical sinusoidal excitations over transmissions lines and analog multipliers for time averaging. One advantage of single tone signaling is the elimination of dispersion as a negative factor in system performance. Moreover, the use of multipliers seems attractive due to the apparent simplicity of this scheme. However, this theoretical simplicity is deceptive.

On a closer analysis, it becomes clear that the precision of the overall scheme depends on the quality of the analog multipliers that can be realized in practice. Of particular relevance is the multiplier output harmonic purity. Typical high frequency multiplier circuits such as those used as RF mixers generate outputs rich in harmonics. Such circuits cannot be used for accurate time averaging because the output harmonics introduce significant timing errors. Therefore, special analog multiplier circuits with low harmonic output content are needed. This is not a trivial design task for low cost applications such as VLSI clocking, where using integrated RF filters to clean up each multiplier output would not be economical. The design of integrated multipliers with very low harmonic content is further complicated if the two multiplier inputs do not have the same magnitude. Therefore, in practice, the signal loss over the transmission lines must be maintained low. Just as before, this limits the technique either in terms of cost through the requirement of implementing expensive low-loss transmission lines, or in limited application possibilities due to short total transmission line length.

SUMMARY

The conventional tree (i.e., corporate feed) distribution scheme and the purely serial distribution scheme represent two cases. Embodiments of the present invention include a method and system that approaches the merits of the purely serial scheme without requiring excessive transmission line lengths. Embodiments of the present invention use modulated signals rather than pure tones for widest possible applications.

In accordance with one embodiment of the present invention, there is provided a signal distribution system, comprising a first tree network excited at one end of its tree trunk by a first generator with a first signal of carrier frequency f, and a second tree network excited at one end of its tree trunk by a second generator with a second signal of carrier frequency f. The signal distribution system further contains a set of pairs of signal detection points. The pairs of signal detection points comprise phase-synchronization pairs, where, in each pair, one point is on the first tree network and the other point is on the second tree network. Furthermore, each pair has the property that the sum of the signal propagation time from the first generator to its first point and the signal propagation time from the second generator to its second point is a constant called synchronization flight-time. The signal distribution system further includes means for processing the signals in each phase-synchronization pair such as to generate an output signal for each pair, whose carrier frequency phase is a function only of the synchronization flight time.

The first and second generators of this embodiment comprise pulse generators, and the circuits processing the phase-synchronization pair signals extract the average arrival time between the two input pulses. The first and second generators may be sinusoidal generators and the circuits processing the phase-synchronization pair signals may be analog multipliers. The first and the second tree networks can be passive optical networks. The first and the second tree networks can be active networks, including optical transmission lines and active optical signal regenerators. The first and the second tree network can be passive electrical networks. The first and the second tree networks can be active networks including electrical transmission lines and electrical signal regenerators.

In accordance with another embodiment of the present invention, there is provided a signal distribution system, comprising a first tree network excited at one end of its tree trunk by a first generator with a first signal of carrier frequency f, and a second tree network excited at one end of its tree trunk by a second generator with a second signal of carrier frequency f, where as the modulation of the first generator and the modulation of the second generator are equal in magnitude and opposite in phase. The signal distribution system of this embodiment further comprises a set of pairs of signal detection points. The signal detection points comprises phase-synchronization pairs such that in each pair one point is on the first tree network and the other point is on the second tree network. Each pair comprises the sum of the signal propagation time from the first generator to its first point and the signal propagation time from the second generator to its second point, which is a constant called synchronization flight-time. The signal distribution system of this embodiment further includes means for processing the signals in each phase-synchronization pair such as to generate an output signal for each pair, whose carrier frequency phase is a function only of the synchronization flight time.

The first and second generators of this embodiment comprise pulse generators, and the circuits processing the phase-synchronization pair signals extract the average arrival time between the two input pulses. The first and second generators comprise sinusoidal generators. The circuits processing the phase-synchronization pair signals can be analog multipliers. The first and the second tree networks comprise passive optical networks. The first and the second tree networks comprise active networks, further comprising optical transmission lines and active optical signal regenerators. The first and the second tree network comprise passive electrical networks. The first and the second tree networks comprise active networks further comprising electrical transmission lines and electrical signal regenerators.

In accordance with another embodiment of the present invention, there is provided a signal distribution system including a first tree network excited at one end of its tree trunk by a first generator with a first signal of carrier frequency f, and a second tree network whose trunk is connected to the first tree network. The signal distribution system further comprises a set of pairs of signal detection points. The signal detection points comprise phase-synchronization pairs, wherein with each pair one point is on the first tree network and the other point is on the second tree network, each pair having the property that the sum of the signal propagation time from the first generator to its first point and the signal propagation time from the second generator to its second point is a constant called synchronization flight-time. The signal distribution system of this embodiment further comprises means for processing the signals in each phase-synchronization pair such as to generate an output signal for each pair, whose carrier frequency phase is a function only of the synchronization flight time.

The first generator of this embodiment comprises a pulse generator, and the circuits processing the phase-synchronization pair signals extract the average arrival time between the two input pulses. The first generator comprises a sinusoidal generator, and the circuits processing the phase-synchronization pair signals comprise analog multipliers. The first and the second tree networks comprise passive optical networks. The first and the second tree networks comprise active networks, further comprising optical transmission lines and active optical signal regenerators. The first and the second tree network comprise passive electrical networks. The first and the second tree networks comprise active networks, further comprising electrical transmission lines and electrical signal regenerators.

In accordance with another embodiment of the present invention, there is provided a signal distribution system comprising first and second tree networks, each network consisting of a trunk and N branches connected to the trunk, whereas the first tree network trunk is excited at one end by a first generator with a first signal of carrier frequency f and the second tree network trunk is excited at one end by a second generator with a second signal of carrier frequency f. The signal distribution system of this embodiment further comprises a set of pairs of signal detection points. The signal detection points comprise phase-synchronization pairs such that in each pair one point is on the first tree network and the other point is on the second tree network. Each pair comprises the property that the sum of the signal propagation time from the first generator to its first point and the signal propagation time from the second generator to its second point is a constant called synchronization flight-time. The signal distribution system of this embodiment further comprises means for processing the signals in each phase-synchronization pair such as to generate an output signal for each pair, whose carrier frequency phase is a function only of the synchronization flight time.

The first and second generators of this embodiment comprise pulse generators, and the circuits processing the phase-synchronization pair signals extract the average arrival time between the two input pulses. The first and second generators comprise sinusoidal generators, and the circuits processing the phase-synchronization pair signals comprise analog multipliers. The first and the second tree networks comprise passive optical networks. The first and the second tree networks comprise active networks including optical transmission lines and active optical signal regenerators. The first and the second tree network comprise passive electrical networks. The first and the second tree networks comprise active networks further comprising electrical transmission lines and electrical signal regenerators.

In accordance with another embodiment of the present invention, there is provided a signal distribution system comprising first and second tree networks. Each network comprises a trunk and N branches connected to the trunk, whereas the first tree network trunk is excited at one end by a first generator with a first signal of carrier frequency f and the second tree network trunk is connected to the trunk of the first tree network. The signal distribution system of this embodiment further comprises a set of pairs of signal detection points. The signal detection points comprise phase-synchronization pairs such that in each pair one point is on the first tree network and the other point is on the second tree network. Each pair has the property that the sum of the signal propagation time from the first generator to its first point and the signal propagation time from the second generator to its second point is a constant called synchronization flight-time. The signal distribution system of this embodiment further comprises means for processing the signals in each phase-synchronization pair such as to generate an output signal for each pair, whose carrier frequency phase is a function only of the synchronization flight time.

The first generator comprises a pulse generator, and the circuits processing the phase-synchronization pair signals extract the average arrival time between the two input pulses. The first generator comprises a sinusoidal generator, and the circuits processing the phase-synchronization pair signals comprise analog multipliers. The first and the second tree networks comprise passive optical networks. The first and the second tree networks comprise active networks further comprising optical transmission lines and active optical signal regenerators. The first and the second tree network comprise passive electrical networks. The first and the second tree networks comprise active networks further comprising electrical transmission lines and electrical signal regenerators.

In accordance with another aspect of the present invention, there is provided a signal distribution system comprising first and second tree networks, each network consisting of a trunk with a set of N branches connected to the trunk, and a second set of M branches connected to the branches in the first set, whereas the first tree network trunk is excited at one end by a first generator with a first signal of carrier frequency f and the second tree network trunk is excited at one end by a second generator with a second signal of carrier frequency f. The signal distribution system of this embodiment further comprises a set of pairs of signal detection points. The signal detection points comprise phase-synchronization pairs such that in each pair one point is on the first tree network and the other point is on the second tree network. Each pair comprises the property that the sum of the signal propagation time from the first generator to its first point and the signal propagation time from the second generator to its second point is a constant called synchronization flight-time. The signal distribution system of this embodiment further comprises means for processing the signals in each phase-synchronization pair such as to generate an output signal for each pair, whose carrier frequency phase is a function only of the synchronization flight time.

The first and second generators comprise pulse generators, and the circuits processing the phase-synchronization pair signals extract the average arrival time between the two input pulses. The first and second generators comprise sinusoidal generators, and the circuits processing the phase-synchronization pair signals comprise analog multipliers. The first and the second tree networks comprise passive optical networks. The first and the second tree networks comprise active networks further comprising optical transmission lines and active optical signal regenerators. The first and the second tree network comprise passive electrical networks. The first and the second tree networks comprise active networks, further comprising electrical transmission lines and electrical signal regenerators.

In accordance with an embodiment of the present invention, there is provided a signal distribution system comprising first and second tree networks, each network comprising a trunk with a set of N branches connected to the trunk, and a second set of M branches connected to the branches in the first set, whereas the first tree network trunk is excited at one end by a first generator with a first signal of carrier frequency f and the second tree network trunk is connected to the first tree network trunk. The signal distribution system of this embodiment further comprises a set of pairs of signal detection points. The signal detection points comprise phase-synchronization pairs such that in each pair one point is on the first tree network and the other point is on the second tree network. Each pair comprises the property that the sum of the signal propagation time from the first generator to its first point and the signal propagation time from the second generator to its second point is a constant called synchronization flight-time. The signal distribution system of this embodiment further comprises means for processing the signals in each phase-synchronization pair such as to generate an output signal for each pair, whose carrier frequency phase is a function only of the synchronization flight time.

The first generator comprises a pulse generator, and the circuits processing the phase-synchronization pair signals extract the average arrival time between the two input pulses. The first generator comprises a sinusoidal generator, and the circuits processing the phase-synchronization pair signals comprise analog multipliers. The first and the second tree networks comprise passive optical networks. The first and the second tree networks comprise active networks further comprising optical transmission lines and active optical signal regenerators. The first and the second tree network comprise passive electrical networks. The first and the second tree networks comprise active networks further comprising electrical transmission lines and electrical signal regenerators.

In accordance with another embodiment of the present invention, there is provided a signal distribution system comprising a first trunk network with no branches excited at one end by a first generator with a first non-periodic signal of carrier frequency f, and a second trunk network with no branches excited at one end by a second generator with a second non-periodic signal of carrier frequency f. The signal distribution system of this embodiment further comprising a set of pairs of signal detection points. The signal detection points comprise phase-synchronization pairs such that in each pair one point is on the first trunk network and the other point is on the second trunk network, each pair having the property that the sum of the signal propagation time from the first generator to its first point and the signal propagation time from the second generator to its second point is a constant called synchronization flight-time. The said signal distribution system further comprises means to process the signals in each phase-synchronization pair such as to generate an output signal for each pair, whose carrier frequency phase is a function only of the synchronization flight time.

The first and second generators of this embodiment comprise pulse generators, and the circuits processing the phase-synchronization pair signals extract the average arrival time between the two input pulses. The first and second generators comprise sinusoidal generators, and the circuits processing the phase-synchronization pair signals comprise analog multipliers. The first and the second tree networks comprise passive optical networks. The first and the second tree networks comprise active networks further comprising optical transmission lines and active optical signal regenerators. The first and the second tree network comprise passive electrical networks. The first and the second tree networks comprise active networks. further comprising electrical transmission lines and electrical signal regenerators.

In accordance with another embodiment of the present invention, there is provided a signal distribution system comprising a first trunk network with no branches excited at one end by a first generator comprising a first non-periodic signal of carrier frequency f, and a second trunk network with no branches excited at one end by a second generator comprising a second non-periodic signal of carrier frequency f, whereas the modulation of the first generator and the modulation of the second generator are equal in magnitude and opposite in phase. The signal distribution system of this embodiment further comprises a set of pairs of signal detection points. The signal detection points comprise phase-synchronization pairs such that in each pair one point is on the first trunk network and the other point is on the second trunk network, each pair having the property that the sum of the signal propagation time from the first generator to its first point and the signal propagation time from the second generator to its second point is a constant called synchronization flight-time. The signal distribution system of this embodiment further comprises means for processing the signals in each phase-synchronization pair such as to generate an output signal for each pair, whose carrier frequency phase is a function only of the synchronization flight time.

The first and second generators of this embodiment comprise pulse generators, and the circuits processing the phase-synchronization pair signals extract the average arrival time between the two input pulses. The first and second generators comprise sinusoidal generators, and the circuits processing the phase-synchronization pair signals comprise analog multipliers. The first and the second tree networks comprise passive optical networks. The first and the second tree networks comprise active networks including optical transmission lines and active optical signal regenerators. The first and the second tree network comprise passive electrical networks. The first and the second tree networks comprise active networks further comprising electrical transmission lines and electrical signal regenerators.

In accordance with another embodiment of the present invention, there is provided a signal distribution system comprising first, second, third, and fourth trunk networks with no branches, whereas the first and the third trunks are excited by first and third generators respectively with first and third signals of carrier frequency f1 and whereas the second and the fourth trunks are excited by second and fourth generators respectively with second and fourth signals of carrier frequency f2. The signal distribution system of this embodiment further comprises a set of signal detection point quadruples. The signal detection point quadruples comprise phase-synchronization quadruples such that in each quadruple the first point is on the first trunk, the second point is on the second trunk, the third point is on the third trunk and the fourth point is on the fourth trunk, each quadruple having the property that the sum of the signal propagation time from the first generator to its first point and the signal propagation time from the third generator to its third point is a constant called first synchronization flight-time and the sum of the signal propagation time from the second generator to its second point and the signal propagation time from the fourth generator to its fourth point is another constant called second synchronization flight-time, which may be different from the first synchronization flight-time. The signal distribution system of this embodiment further comprises means for processing the signals in each phase-synchronization quadruple such as to generate an output signal for each quadruple, whose carrier frequency phase is a function only of the first synchronization flight time and of the second synchronization flight-time.

The four generators of this embodiment comprise sinusoidal generators and the circuits processing the phase-synchronization quadruple signals further comprising three analog multipliers, the first multiplier connected to the first and the second points in the quadruple, the second multiplier connected to the third and the fourth points in the quadruple and the third multiplier connected such as to multiply the filtered outputs of the first and second multipliers. The four trunks comprise passive optical networks. The four trunks are active networks including optical transmission lines and active optical signal regenerators. The four trunks comprise passive electrical networks. The four trunks comprise active networks including electrical transmission lines and electrical signal regenerators.

In accordance with another embodiment of the present invention, there is provided a signal distribution system comprising first, second, third, and fourth trunk networks with no branches, whereas the first and the third trunks are excited by first and third generators respectively with first and third signals of carrier frequency f1 and first and third modulations with equal magnitude and opposite phases. The second and the fourth trunks are excited by second and fourth generators respectively with second and fourth signals of carrier frequency f2 and second and fourth modulations with equal magnitude and opposite phases. The signal distribution system of this embodiment further comprises a set of signal detection point quadruples called phase-synchronization quadruples such that in each quadruple the first point is on the first trunk, the second point is on the second trunk, the third point is on the third trunk and the fourth point is on the fourth trunk, each quadruple having the property that the sum of the signal propagation time from the first generator to its first point and the signal propagation time from the third generator to its third point is a constant called first synchronization flight-time and the sum of the signal propagation time from the second generator to its second point and the signal propagation time from the fourth generator to its fourth point is another constant called second synchronization flight-time, which may be different from the first synchronization flight-time. The signal distribution system of this embodiment further comprises means for processing the signals in each phase-synchronization quadruple such as to generate an output signal for each quadruple, whose carrier frequency phase is a function only of the first synchronization flight time and of the second synchronization flight-time.

The four generators of this embodiment comprise sinusoidal generators and the circuits processing the phase-synchronization quadruple signals comprise three analog multipliers, the first multiplier connected to the first and the second points in the quadruple, the second multiplier connected to the third and the fourth points in the quadruple and the third multiplier connected such as to multiply the filtered outputs of the first and second multipliers. The four trunks are passive optical networks. The four trunks are active networks comprising optical transmission lines and active optical signal regenerators. The four trunks comprise passive electrical networks. The four trunks comprise active networks further comprising electrical transmission lines and electrical signal regenerators.

In accordance with another aspect of the present invention, there is provided a signal distribution system including first, second, third, and fourth trunk networks with no branches, whereas the first trunk is excited by a first generator with a first signal of carrier frequency f1, the second trunk is excited by a second generator with a second signal of carrier frequency f2, the third trunk is connected to the first trunk, and the fourth trunk is connected to the second trunk. The signal distribution system of this embodiment further comprises a set of signal detection point quadruples comprising phase-synchronization quadruples such that in each quadruple the first point is on the first trunk, the second point is on the second trunk, the third point is on the third trunk and the fourth point is on the fourth trunk, each quadruple having the property that the sum of the signal propagation time from the first generator to its first point and the signal propagation time from the first generator to its third point is a constant called first synchronization flight-time and the sum of the signal propagation time from the second generator to its second point and the signal propagation time from the second generator to its fourth point is another constant called second synchronization flight-time, which may be different from the first synchronization flight-time. The signal distribution system of this embodiment further comprises means for processing the signals in each phase-synchronization quadruple such as to generate an output signal for each quadruple, whose carrier frequency phase is a function only of the first synchronization flight time and of the second synchronization flight-time.

The four generators of this embodiment are sinusoidal generators and the circuits processing the phase-synchronization quadruple signals include three analog multipliers, the first multiplier connected to the first and the second points in the quadruple, the second multiplier connected to the third and the fourth points in the quadruple and the third multiplier connected such as to multiply the filtered outputs of the first and second multipliers. The four trunks comprise passive optical networks. The four trunks comprise active networks further comprising optical transmission lines and active optical signal regenerators. The four trunks comprise passive electrical networks. The four trunks comprise active networks, further comprising electrical transmission lines and electrical signal regenerators.

In accordance with another embodiment of the present invention, there is provided a signal distribution system comprising first, second, third, and fourth tree networks, whereas the trunks of the first and the third tree networks are excited by first and third generators, respectively, with first and third signals of carrier frequency f1 and whereas the trunks of the second and the fourth tree networks are excited by second and fourth generators, respectively, with second and fourth signals of carrier frequency f2. The signal distribution system of this embodiment further comprises a set of signal detection point quadruples called phase-synchronization quadruples such that in each quadruple the first point is on the first tree, the second point is on the second tree, the third point is on the third tree and the fourth point is on the fourth tree, each quadruple having the property that the sum of the signal propagation time from the first generator to its first point and the signal propagation time from the third generator to its third point is a constant called first synchronization flight-time and the sum of the signal propagation time from the second generator to its second point and the signal propagation time from the fourth generator to its fourth point is another constant called second synchronization flight-time, which may be different from the first synchronization flight-time. The signal distribution system of this embodiment further comprises means for processing the signals in each phase-synchronization quadruple such as to generate an output signal for each quadruple, whose carrier frequency phase is a function only of the first synchronization flight time and of the second synchronization flight-time.

The four generators of this embodiment comprise sinusoidal generators and the circuits processing the phase-synchronization quadruple signals comprise three analog multipliers, the first multiplier connected to the first and the second points in the quadruple, the second multiplier connected to the third and the fourth points in the quadruple and the third multiplier connected such as to multiply the filtered outputs of the first and second multipliers. The four trees comprise passive optical networks. The four trees comprise active networks further comprising optical transmission lines and active optical signal regenerators. The four trees comprise passive electrical networks. The four trees comprise active networks including electrical transmission lines and electrical signal regenerators.

In accordance with another embodiment of the present invention, there is provided a signal distribution system comprising first, second, third, and fourth tree networks, whereas the trunks of the first and the third tree networks are excited by first and third generators respectively with first and third signals of carrier frequency f1 and first and third modulations with equal magnitude and opposite phases and whereas the trunks of the second and the fourth tree networks are excited by second and fourth generators respectively with second and fourth signals of carrier frequency f2 and second and fourth modulations with equal magnitude and opposite phases. The signal distribution system of the present embodiment further comprises a set of signal detection point quadruples called phase-synchronization quadruples such that in each quadruple the first point is on the first tree, the second point is on the second tree, the third point is on the third tree and the fourth point is on the fourth tree, each quadruple comprising the property that the sum of the signal propagation time from the first generator to its first point and the signal propagation time from the third generator to its third point is a constant called first synchronization flight-time and the sum of the signal propagation time from the second generator to its second point and the signal propagation time from the fourth generator to its fourth point is another constant called second synchronization flight-time, which may be different from the first synchronization flight-time. The signal distribution system of this embodiment further comprises means for processing the signals in each phase-synchronization quadruple such as to generate an output signal for each quadruple, whose carrier frequency phase is a function only of the first synchronization flight time and of the second synchronization flight-time.

The four generators of this embodiment comprise sinusoidal generators and the circuits processing the phase-synchronization quadruple signals comprises three analog multipliers, the first multiplier connected to the first and the second points in the quadruple, the second multiplier connected to the third and the fourth points in the quadruple and the third multiplier connected such as to multiply the filtered outputs of the first and second multipliers. The four trees comprise passive optical networks. The four trees comprise active networks comprising optical transmission lines and active optical signal regenerators. The four trees comprise passive electrical networks. The four trees comprise active networks further comprising electrical transmission lines and electrical signal regenerators.

In accordance with another embodiment of the present invention, there is provided a signal distribution system comprising first, second, third, and fourth tree networks, whereas the trunk of the first tree network is excited by a first generator with a first signal of carrier frequency f1, the trunk of the second tree network is excited by a second generator with a second signal of carrier frequency f2, the trunk of the third tree network is connected to the first tree network, and the trunk of the fourth tree network is connected to the second tree network. The signal distribution system of this embodiment further contains a set of signal detection point quadruples called phase-synchronization quadruples such that in each quadruple the first point is on the first tree, the second point is on the second tree, the third point is on the third tree and the fourth point is on the fourth tree, each quadruple comprising the property that the sum of the signal propagation time from the first generator to its first point and the signal propagation time from the third generator to its third point is a constant called first synchronization flight-time and the sum of the signal propagation time from the second generator to its second point and the signal propagation time from the second generator to its fourth point is another constant called second synchronization flight-time, which may be different from the first synchronization flight-time. The signal distribution system of this embodiment further comprises means for processing the signals in each phase-synchronization quadruple such as to generate an output signal for each quadruple, whose carrier frequency phase is a function only of the first synchronization flight time and of the second synchronization flight-time.

The four generators of this embodiment comprise sinusoidal generators and the circuits processing the phase-synchronization quadruple signals comprise three analog multipliers, the first multiplier connected to the first and the second points in the quadruple, the second multiplier connected to the third and the fourth points in the quadruple and the third multiplier connected such as to multiply the filtered outputs of the first and second multipliers. The four trees comprise passive optical networks. The four trees comprise active networks further comprising optical transmission lines and active optical signal regenerators. The four trees comprising passive electrical networks. The four trees comprising active networks further comprising electrical transmission lines and electrical signal regenerators.

In accordance with another embodiment of the present invention, there is provided a signal distribution system comprising first, second, third, and fourth trunk networks with no branches, whereas the first and third trunks are excited by first and third generators respectively with first and third signals of carrier frequency f1 and carrier phases in quadrature, and whereas the second and the fourth trunks are excited by second and fourth generators respectively with second and fourth signals of carrier frequency f2 and carrier phases in quadrature. The signal distribution system of this embodiment further comprises a set of signal detection point quadruples called phase-synchronization quadruples such that in each quadruple the first point is on the first trunk, the second point is on the second trunk, the third point is on the third trunk and the fourth point is on the fourth trunk, each quadruple having the property that the sum of the signal propagation time from the first generator to its first point and the signal propagation time from the second generator to its second point is a constant called first synchronization flight-time and the sum of the signal propagation time from the third generator to its third point and the signal propagation time from the fourth generator to its fourth point is another constant called second synchronization flight-time, which may be different from the first synchronization flight-time. The signal distribution system of this embodiment further comprises means for processing the signals in each phase-synchronization quadruple such as to generate an output signal for each quadruple, whose carrier frequency phase is a function only of the first synchronization flight time and of the second synchronization flight-time.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein:

FIG. 33 depicts a schematic diagram of a two frequency I/Q system with two tree networks and two generators in accordance with an embodiment of the present invention;

Figure 1:
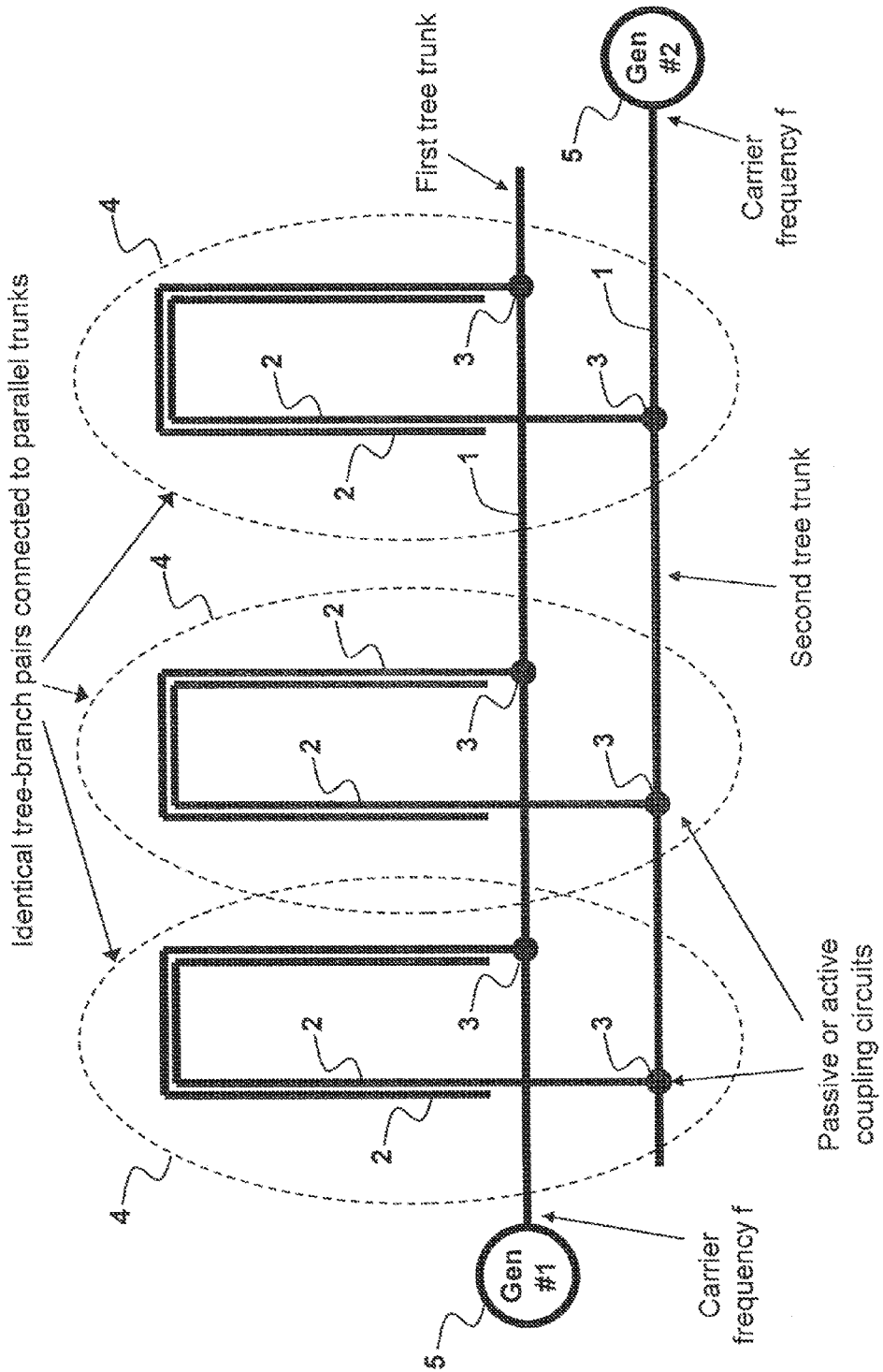
FIG. 1 depicts a schematic diagram of a synchronization system having two independent tree networks with paired branches, excited by two independent generators in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the Figures.

DETAILED DESCRIPTION

A Single-Frequency System Using Two-Level Trees

Embodiments of the present invention include the generation of at least two modulated signals at many points in space such that their carriers have the same frequency and are in precise phase relationship to each other.

FIG. 1 depicts a schematic diagram of two independent tree networks, each consisting of a tree trunk 1 and tree branches 2. The tree trunk and the tree branches are properly terminated transmission lines (termination circuits are not shown in FIG. 1 for simplicity), such as electrical microstrip lines, optical wave-guides, or sound propagating guides. The difference between the trunk 1 and the branches 2 is not in substance but rather in name, based on the relative position of the transmission lines (TL) with respect to the tree network input port. The trunk 1 is defined as the transmission line connected directly to the input port. The branches 2 are coupled to the trunk 1 through passive or active circuits 3. A passive coupling circuit could be a simple signal splitter. An active coupling circuit in the case of electrical systems could be a voltage amplifier sensing the voltage of the trunk at the coupling point and driving the branch. The signal delays through these coupling circuits are assumes either identical for all coupling circuits or in known relationships to each other. For simplicity and clarity, the tree network drawings in FIG. 1 and the tree network drawings in all other Figures of this specification show no termination circuits explicitly. Nevertheless, it is to be understood that all network trunks and branches are properly terminated (with simple resistors or more involved networks) in order to avoid any significant signal reflections.

The tree networks described with regard to FIG. 1 are particular cases of a larger class of tree networks referred to in this specification as TL-tree networks. In general, a TL-tree network has a trunk, which is a TL coupled to the TL-tree input, and many branches, which are TLs coupled either to the trunk or to other branches. The level of the TL-tree network is the largest number of branches through which a signal applied at the TL-tree input travels plus one (counting the trunk as a branch). For example, the TL-trees in FIG. 1 are two-level trees (input signals travels through one trunk and one branch). Hereinbelow, examples are provided of TL-trees with levels larger than two (e.g., FIGS. 19-20). It should be understood that embodiments of the present invention contemplate TL-tree networks but also many tree networks, which are not TL-tree networks. For example, the trunk and some or all of the branches may be constructed without TLs. The use of TL components is not critical.

The two tree networks in FIG. 1 have parallel trunks and their branches are paired such that all pairs 4 have substantially identical physical structure. The position where each branch pair connects to the parallel trunks is not critical. The two branches in every pair are in close proximity to each other.

Two generators 5 apply input signals to the tree networks in FIG. 1. The generator signals may be modulated carriers of frequency f. A carrier is any periodic signal when modulation is not presents (zero modulation) and the carrier frequency is the frequency of the carrier when modulation is not present. When modulation is present, such as phase or frequency modulation, the carrier is usually not a periodic signal.

Figure 2:
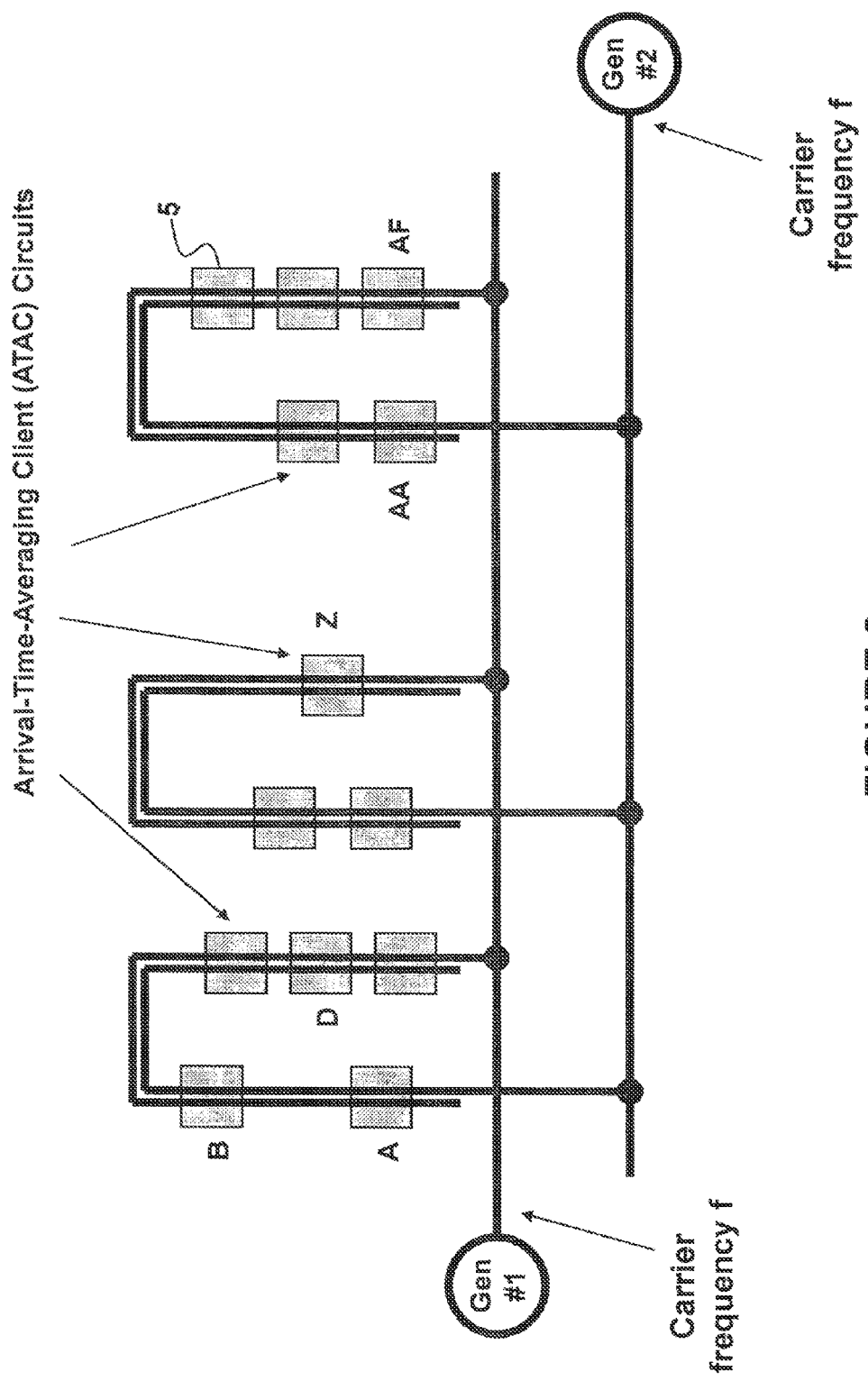
FIG. 2 depicts a schematic diagram of the tree networks of the synchronization system of FIG. 1 with Arrival-Time-Averaging Client (ATAC) circuits placed on the branch pairs in accordance with an embodiment of the present invention.

FIG. 2 depicts a schematic diagram of a signal distribution system consisting of the network configuration of FIG. 1 and a number (subject to a maximum practical limit—to be explained below) of substantially identical circuit blocks called "Arrival-Time-Averaging Client" or ATAC circuits attached to the network. The block 5 represents one of the ATAC circuits in FIG. 2. Other ATAC circuits in FIG. 2 are labeled A, B, D, Z, AA, and AF.

Figure 3:
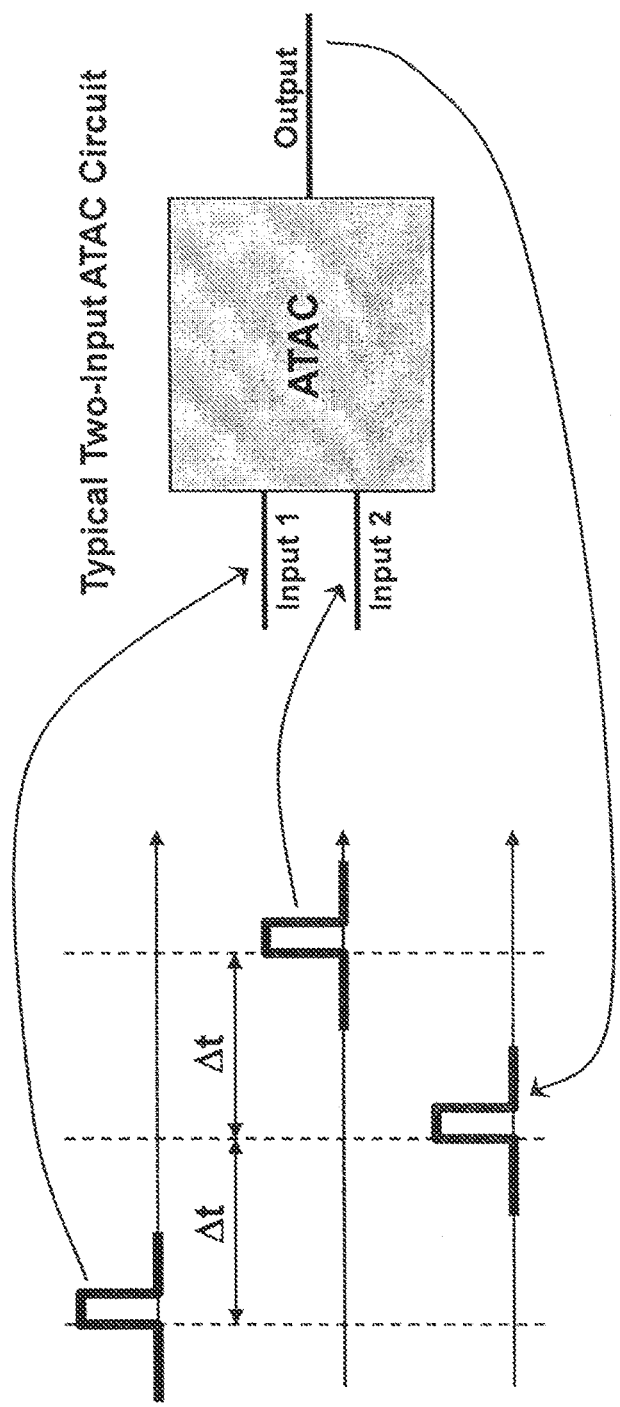
FIG. 3 illustrates a timing diagram and the functionality of an ATAC circuit where generator signals contain pulses in accordance with an embodiment of the present invention.

Each ATAC circuit has two inputs and one output as shown in FIG. 3. The ATAC circuit inputs are connected to the branches of the branch pairs at adjacent positions. Some of the ATAC circuits may be connected in reverse order than others. For example, if the "normal" connection order is defined as first input of the ATAC circuit attached to the first tree network and second input of the ATAC circuit attached to the second tree network, then some of the ATAC circuits may be connected with their first input attached to the second tree network and their second inputs attached to the first tree network.

The ATAC circuits are assumed not to load the transmission lines forming the tree branches in any significant way. In other words, the signals traveling on each tree are assumed undisturbed by the presence of the ATAC circuits. As a further clarification, if the system in FIG. 2 is purely electrical, the input impedance of the ATAC circuits is assumed large with respect to the characteristic impedance of the transmission lines such that the ATAC circuits just sense the voltages or currents on the branches with no significant effects in the tree signals. This assumption is reasonable in practice if the number of ATAC circuits is not excessive. This explains the earlier comment regarding the maximum practical limit for the number of ATAC circuits.

The functionality of the ATAC circuit is explained in FIG. 3 for the case when the generator signals are periodic pulses (zero modulation). In general, these pulses arrive at the two ATAC circuit inputs at different times. The ATAC circuit generates output pulses in the middle of the period between the two input pulses, hence the name of the circuit. In other words, the ATAC circuit output pulses are placed at the average time between the arrival times of the input pulses. The functionality of the ATAC circuit for the case of periodic pulses is described as in the clock extracting circuits in more detail in Wayne D. Grover "Method and Apparatus for Clock Distribution and for Distributed Clock Synchronization" U.S. Pat. No. 5,361,277, Nov. 1, 1994; Michael Farmwald and Mark Horowitz, "Apparatus for Synchronously Generating Clock Signals in a Data Processing System" U.S. Pat. No. 5,243,703, Sep. 7, 1993; and Charles D. Miller "Signals Distribution System" U.S. Pat. No. 5,712,882, Jan. 27, 1998, the disclosures of which are incorporated herein by reference in their entirety. Practical implementations include PLL and DLL circuits.

Figure 4:
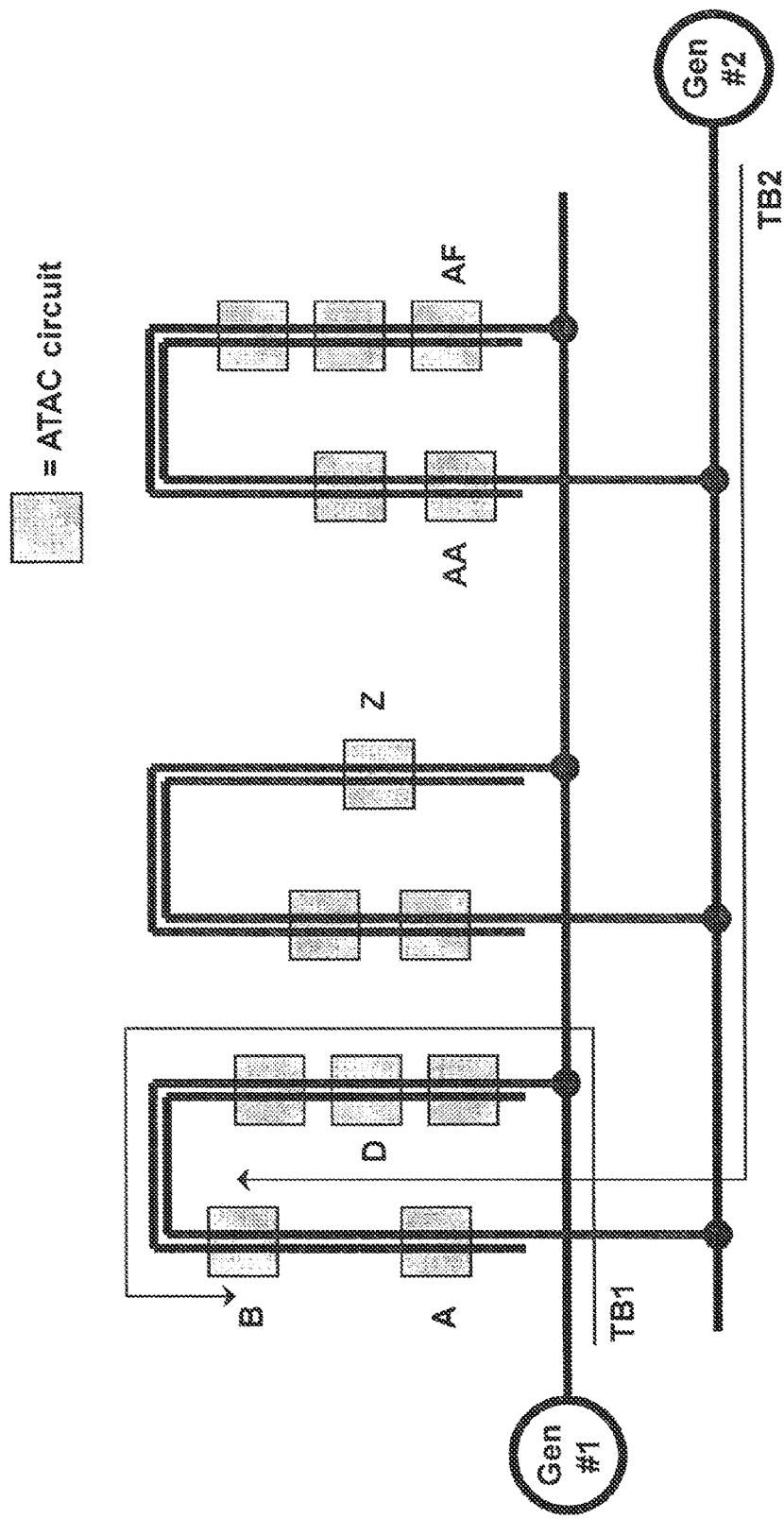
FIG. 4 depicts a schematic diagram of the synchronization system of FIG. 2, illustrating travel times TB1 and TB2 from the two generators to ATAC circuit B and defines the system quantity SFT (Synchronization Time Flight) as the sum of TB1 and TB1 in accordance with an embodiment of the present invention.
Figure 5:
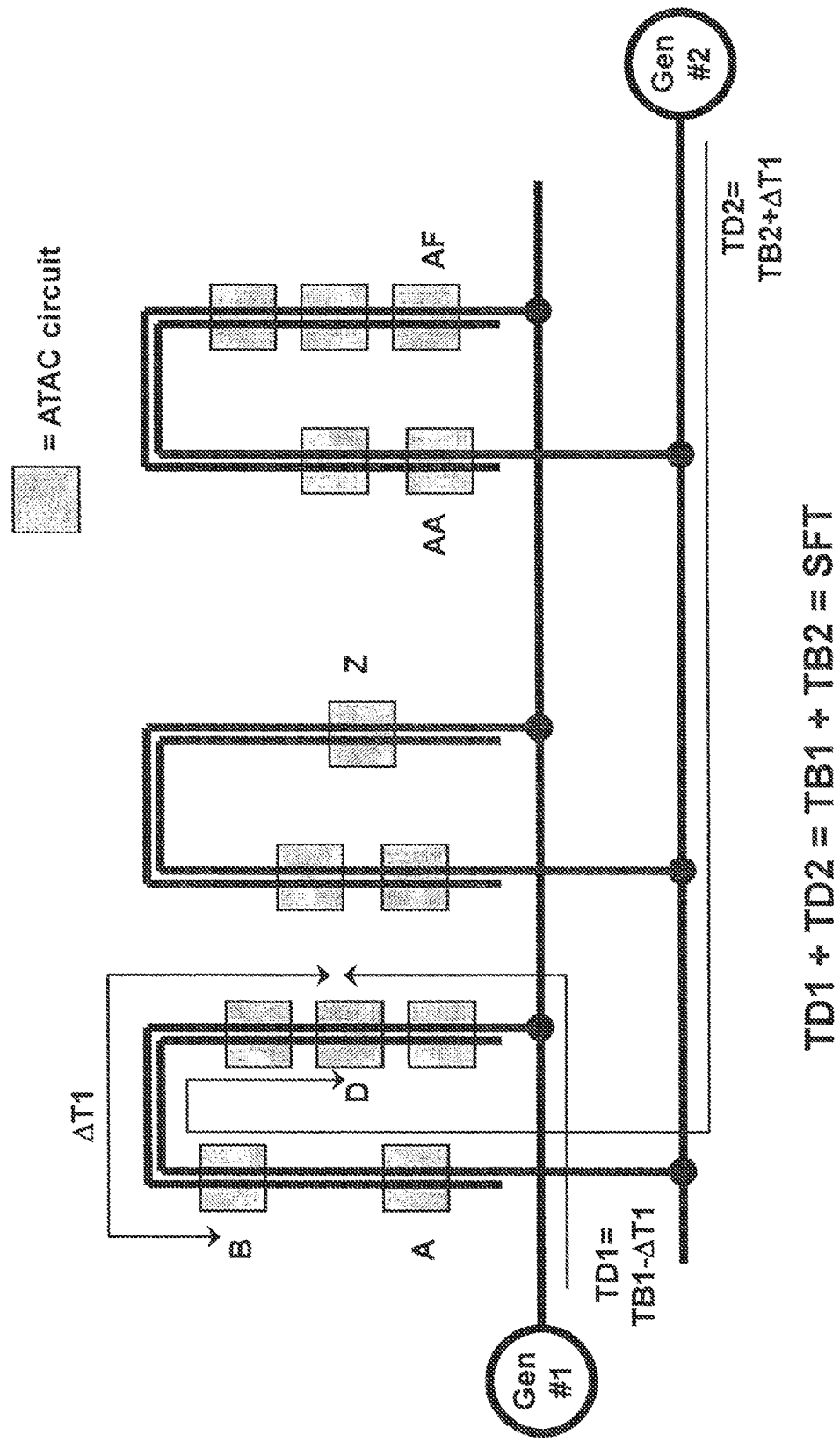
FIG. 5 depicts a schematic diagram of the synchronization system of FIG. 2, illustrating the travel times TD1 and TD2 from the two generators to ATAC circuit D and shows their sum TD1+TD2 equals SFT.
Figure 6:
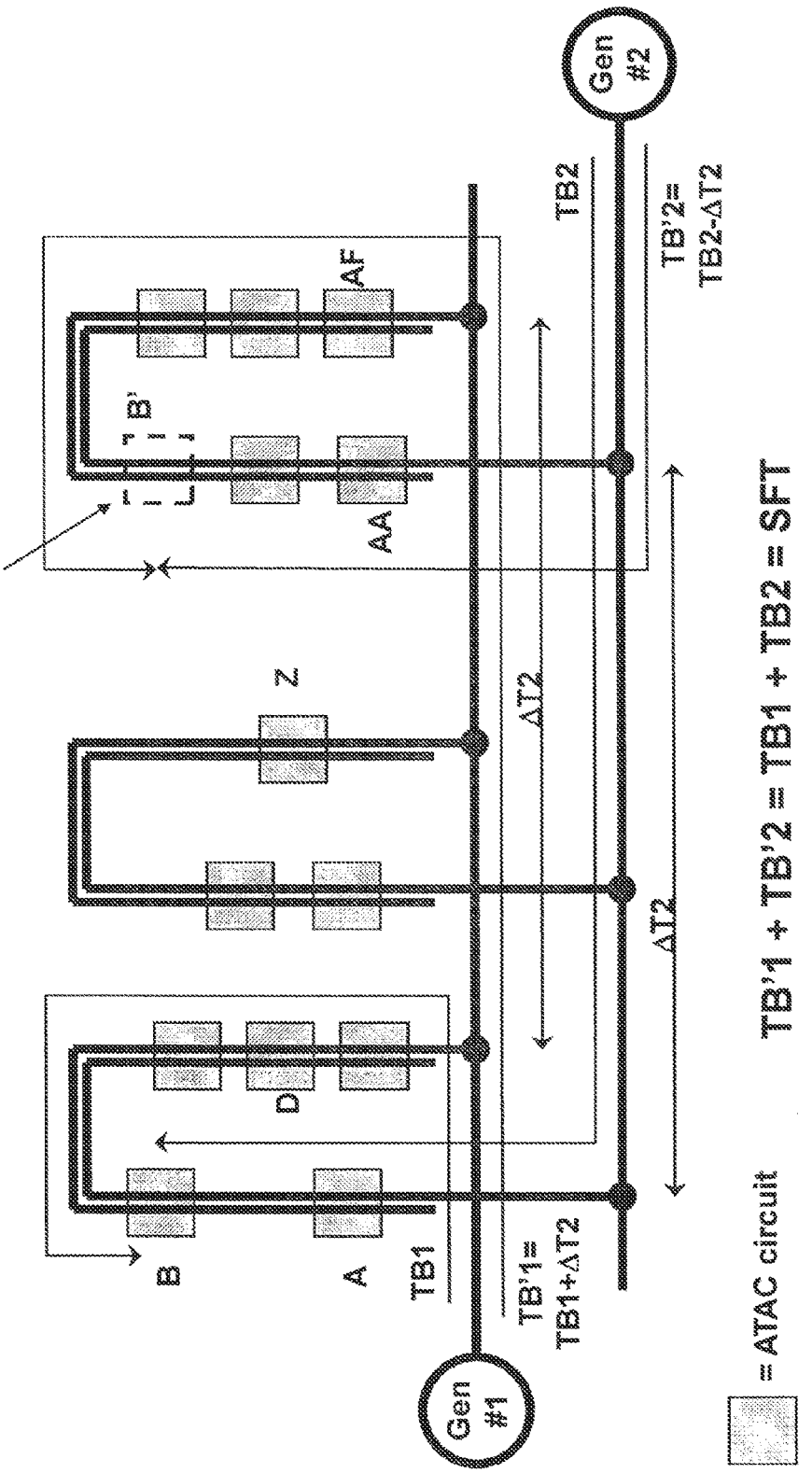
FIG. 6 depicts a schematic diagram of a synchronization system, illustrating the travel times TB'1 and TB'2 from the two generators to virtual ATAC circuit B' and shows their sum TB'1+TB'2 equals SFT in accordance with an embodiment of the present invention.

The outputs of the ATAC circuits in the system of FIG. 2 have phase synchronous carriers. For simplicity, consider the case of generator signals, which are periodic and have no modulation. The system in FIG. 2 is also shown in FIGS. 4-6, with different signal propagation paths and times specifically indicated. The ATAC circuits labeled A, B, C, Z, AA, AF, will be referred as Client A, B, C, etc.

In FIG. 4, the signal propagating times from the tree inputs to Client B are TB1 and TB2. We define a parameter called "Synchronization Flight Time" or SFT as the sum of TB1 and TB1:

$$SFT = TB1 + TB2 \quad (1)$$

FIG. 5 shows the signal paths to Client D and the associated signal travel times TD1 and TD2. These two quantities can be expressed in terms of TB1 and TB2 as follows:

$$TD1 = TB1 - \Delta T1 \quad (2a)$$

$$TD2 = TB2 + \Delta T1 \quad (2b)$$

The quantity $\Delta T1$ in relations (2) is the signal travel time on the tree branches between the positions of Clients B and D (FIG. 5). Adding relations (2) and using (1), we have:

$$TD1 + TD2 = SFT \quad (3)$$

The relation (3) was derived without any specific assumptions regarding the position of Client D on its branch pair. Therefore, for the branch pair considered, SFT is a constant. By similar arguments, all branch pairs have a constant SFT. Furthermore, we can show that the SFT of all branch pairs have the same value, and therefore SFT is a system constant. This will be done next.

FIG. 6 focuses on calculating the SFT of the branch pair on the far right with respect to the SFT of the branch pair on the far left. This calculation is straightforward if one assumes that a client existed on the far right branch pair at the same relative position in its branch pair as Client B is on the far left branch pair. This imaginary client for purposes of illustration is referred to as Virtual Client B'. Based on the previous discussion, the SFT of Virtual Client B' is a constant for the far right branch pair. The travel times of signals from the generators to the position of Virtual Client B' are calculated, TB'1 and TB'2 as:

$$TB'1 = TB1 + \Delta T2 \quad (4a)$$

$$TB'2 = TB2 - \Delta T2 \quad (4b)$$

The quantity $\Delta T2$ in relations (4) is the signal travel time on the tree trunks for the trunk pair section connecting the two branch pairs under consideration (far left and far right). A different way of explaining this is to notice the far right branch pair can be regarded as a translation in space of the far left branch pair and $\Delta T2$ represents the time necessary for the signals to travel over this translation. Adding relations (4) results in SFT being a system constant:

$$TB'1 + TB'2 = TD1 + TD2 = SFT \quad (5)$$

It can be concluded that for the distribution system in FIG. 2, all Clients (ATAC circuits) placed at any arbitrary positions on the branch pairs detect signals whose combined total travel time from their respective generators is a constant (SFT). The significance of this property is illustrated in FIG. 7.

Figure 7:
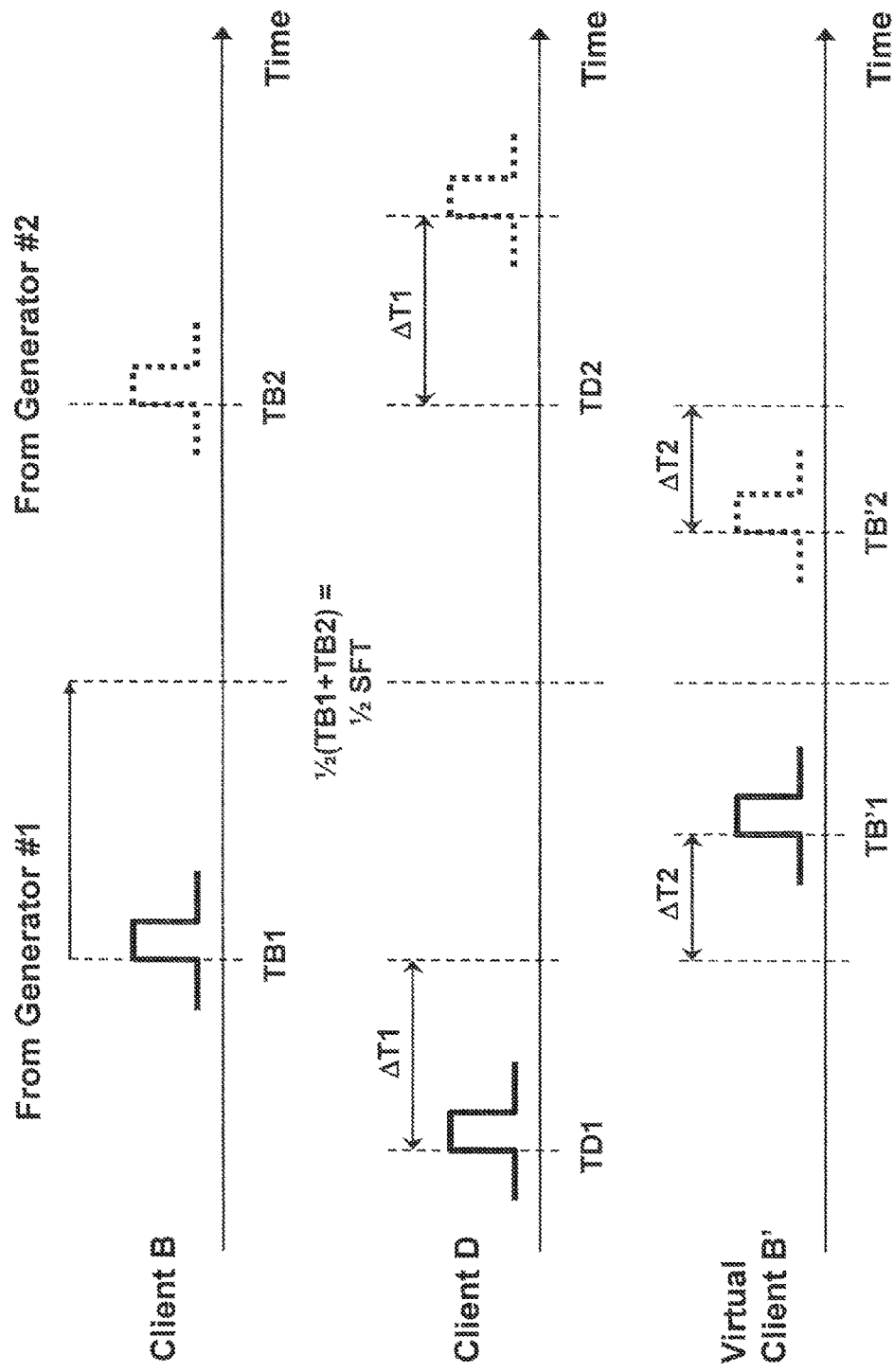
FIG. 7 illustrates a timing diagram of the synchronization system of FIG. 6, depicting the arrival pulse times at client B, client D, and virtual client B' from FIG. 6, assuming both generators send pulses at time equal zero, demonstrating that the arrival time average is the same for all cases and is a function of SFT in accordance with an embodiment of the present invention.

Assuming the generator signals are periodic pulses originating at time zero, FIG. 7 shows the instances these pulses arrive at positions B, D, and B'. The pulses shown in solid lines originate from Generator #1 and the pulses shown in dotted lines originate from Generator #2. The average pulse arrival time is an absolute time instance equal to half the value of SFT (assuming time zero is defined at the instance when pulses are generated by the generator). Therefore, all Client outputs are in precise phase synchronization. This property is independent of the pulse generation times, as it can be easily verified with the help of the diagrams in FIG. 7. The relative positions of the pulses originating from each generator depend only on the quantities $\Delta T1$ and $\Delta T2$, which are system invariants, i.e., quantities set by the system configuration. These invariants determine an inherent symmetry between the pulses coming from the Generator #1 and those coming from the Generator #2 on the time coordinate. This symmetry determines the global reference extracted by the ATAC circuits.

Figure 8:
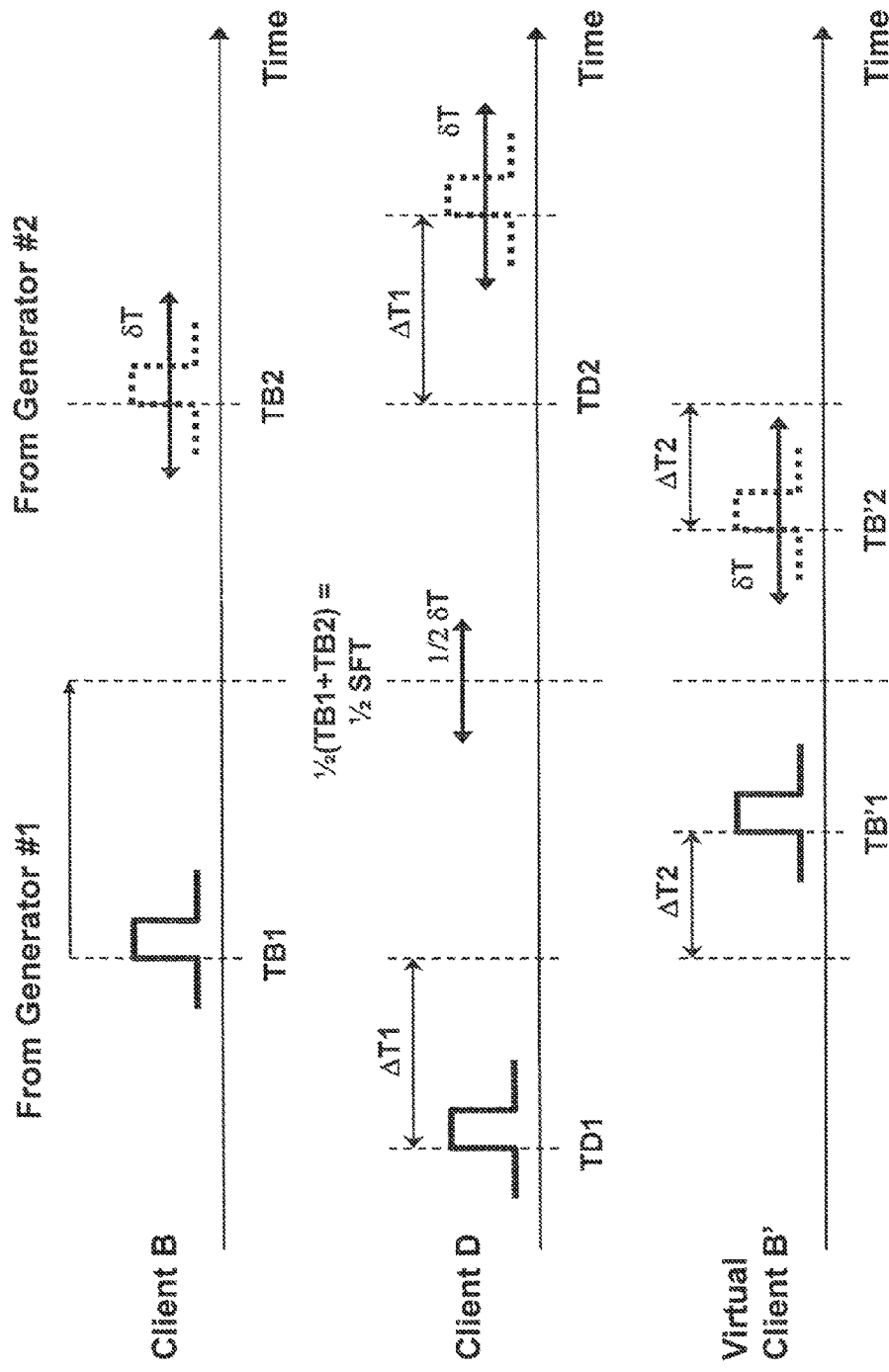
FIG. 8 illustrates a timing diagram of the synchronization system of FIG. 6, depicting the effect of Generator #2 angle modulation with δT peak-to-peak phase variation in accordance with an embodiment of the present invention.

The previous discussions show that although the Clients in the system of FIG. 2 are positioned at different coordinates in space, their outputs are in precise phase alignment if the inputs are periodic signals, i.e. un-modulated carriers. The addition of angle modulation whose bandwidth is small with respect to the carrier, does not change the practical system behavior in any significant way. FIG. 8 demonstrates this graphically.

In FIG. 8, it is assumed that the Generator #2 is phase modulated with a signal whose bandwidth is much smaller than the carrier frequency. For example, the carrier frequency is 1 GHz and the modulating signal bandwidth is 1 KHz. In this case, there are 100000 carrier cycles in each modulating signal cycle for 1 KHz sinusoidal modulation. If the modulation signals is a general random signal with 1 KHz bandwidth, the rate of change of the modulation signals is even smaller. The addition of this modulation will change the pulse diagrams by moving the dotted pulses in FIG. 8 back and forth very slowly over thousands of pulses. FIG. 8 illustrates the peak-to-peak $\delta T$ phase variation of the pulses coming from generator #2. The Client outputs contain the same modulation reduced by a factor of two, due to averaging with a zero modulation signal (from Generator #1).

In general, the propagation of the modulated signal along the transmission lines from Generator #2 to any Client has the same speed as the carrier propagation. Therefore, each Client will receive this signal with an appropriate delay. However, in many practical instances of interest the signal propagation time from the generators to the farthest Client is very short with respect to the modulation autocorrelation width (i.e., inverse of modulation bandwidth). Therefore, from a practical point of view all Clients receive modulated signals instantaneously.

If both generator signals in FIG. 2 are angle modulated, the Client outputs contain an average angle modulation. An important case is when the two generators are modulated by opposite angle directions. The output Client average modulation becomes zero (carrier only outputs) despite the fact that each tree carries modulated signals. This is an important case for VLSI clock distribution, where EMI is a potential problem. Instead of distributing pure periodic signals with concentrated energy at one frequency and harmonics, embodiments of the present invention contemplate distributing modulated signals with a broader energy distribution for lower EMI but still recover pure clock signals at the client outputs.

Figure 9:
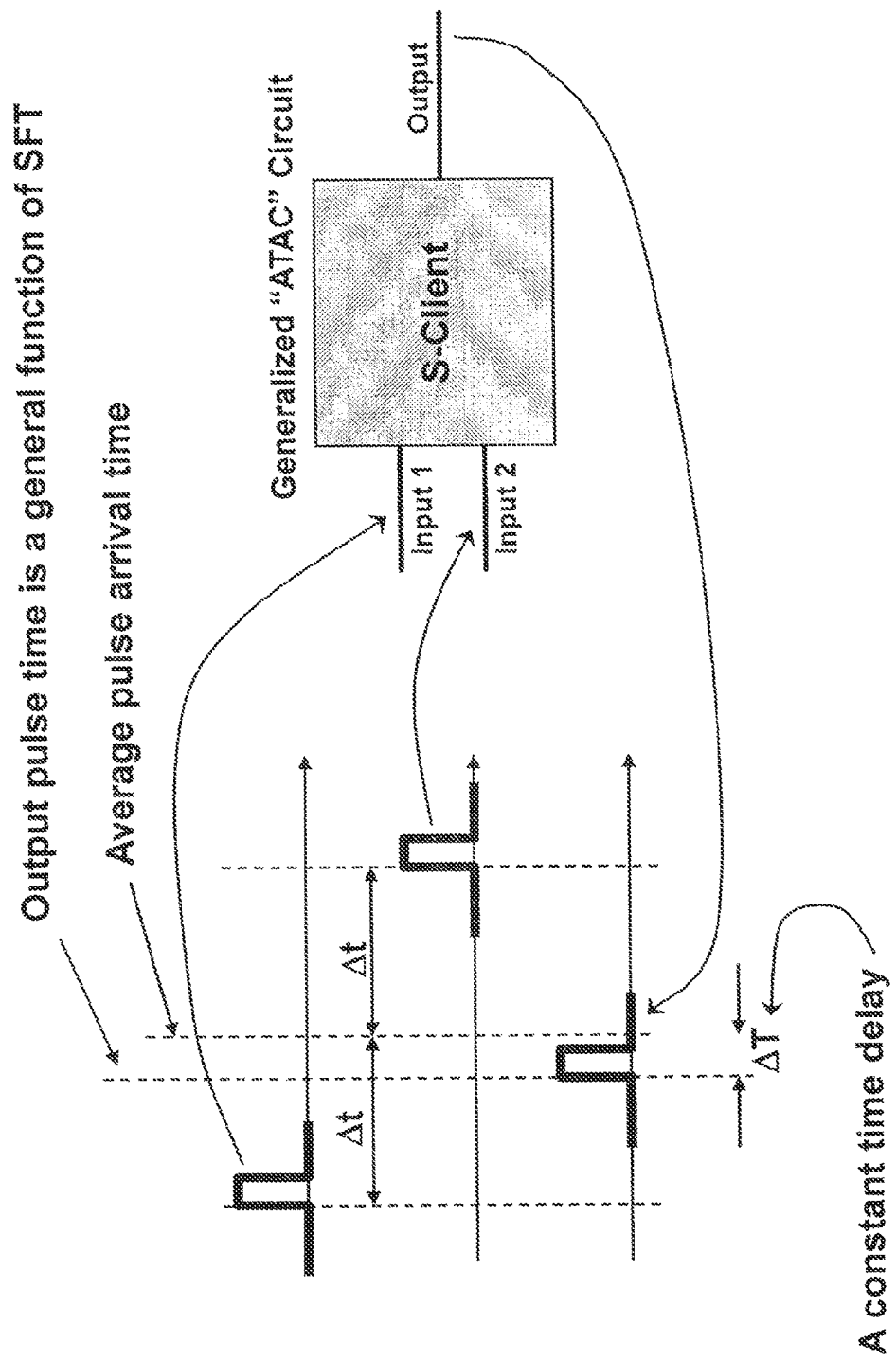
FIG. 9 illustrates a timing diagram and the functionality of a general S-Client circuit, whose output is a function of SFT and where the functionality is more general than that of any ATAC circuit in accordance with an embodiment of the present invention.
Figure 10:
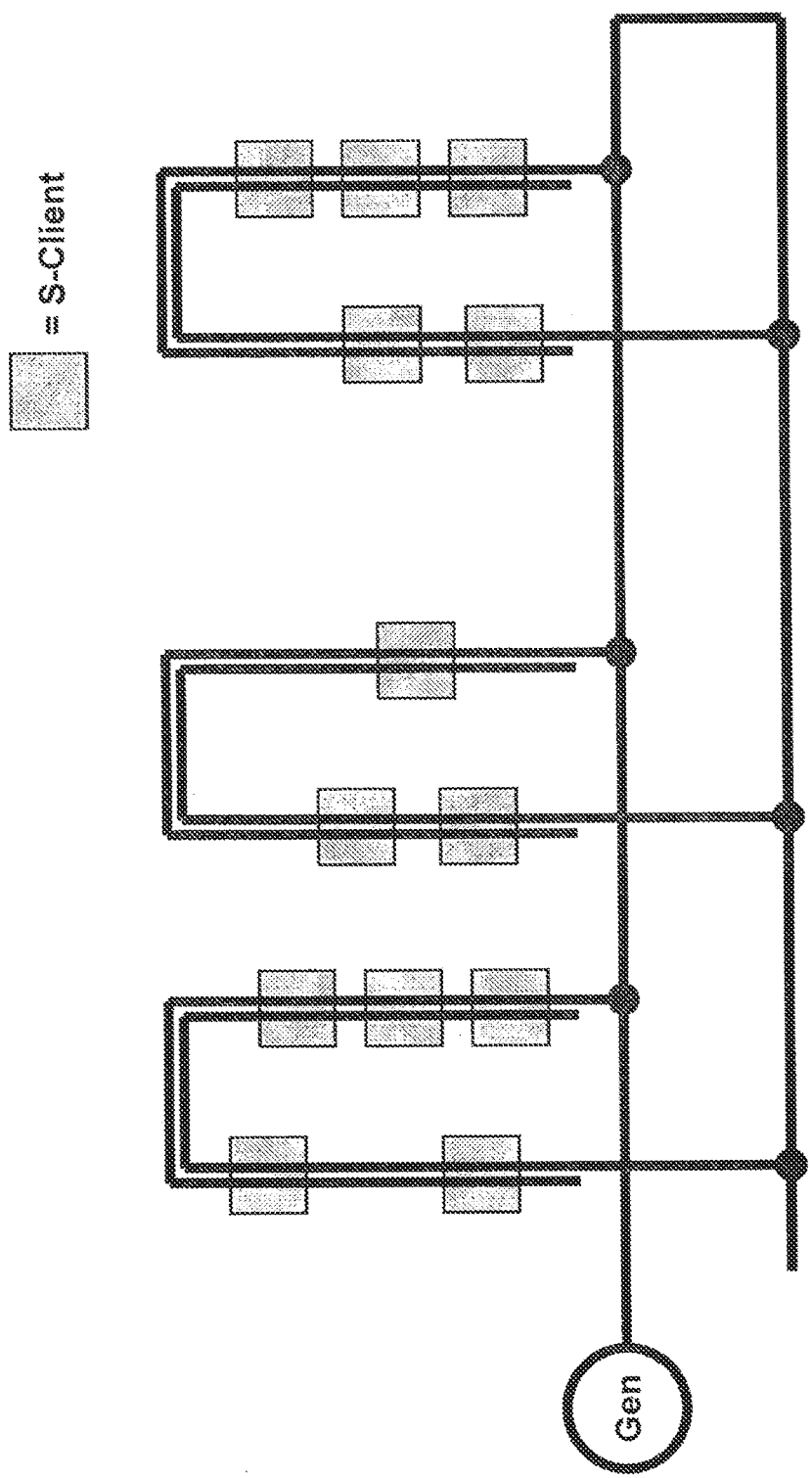
FIG. 10 illustrates a schematic diagram of a synchronization system having a single generator in accordance with an embodiment of the present invention.
Figure 11:
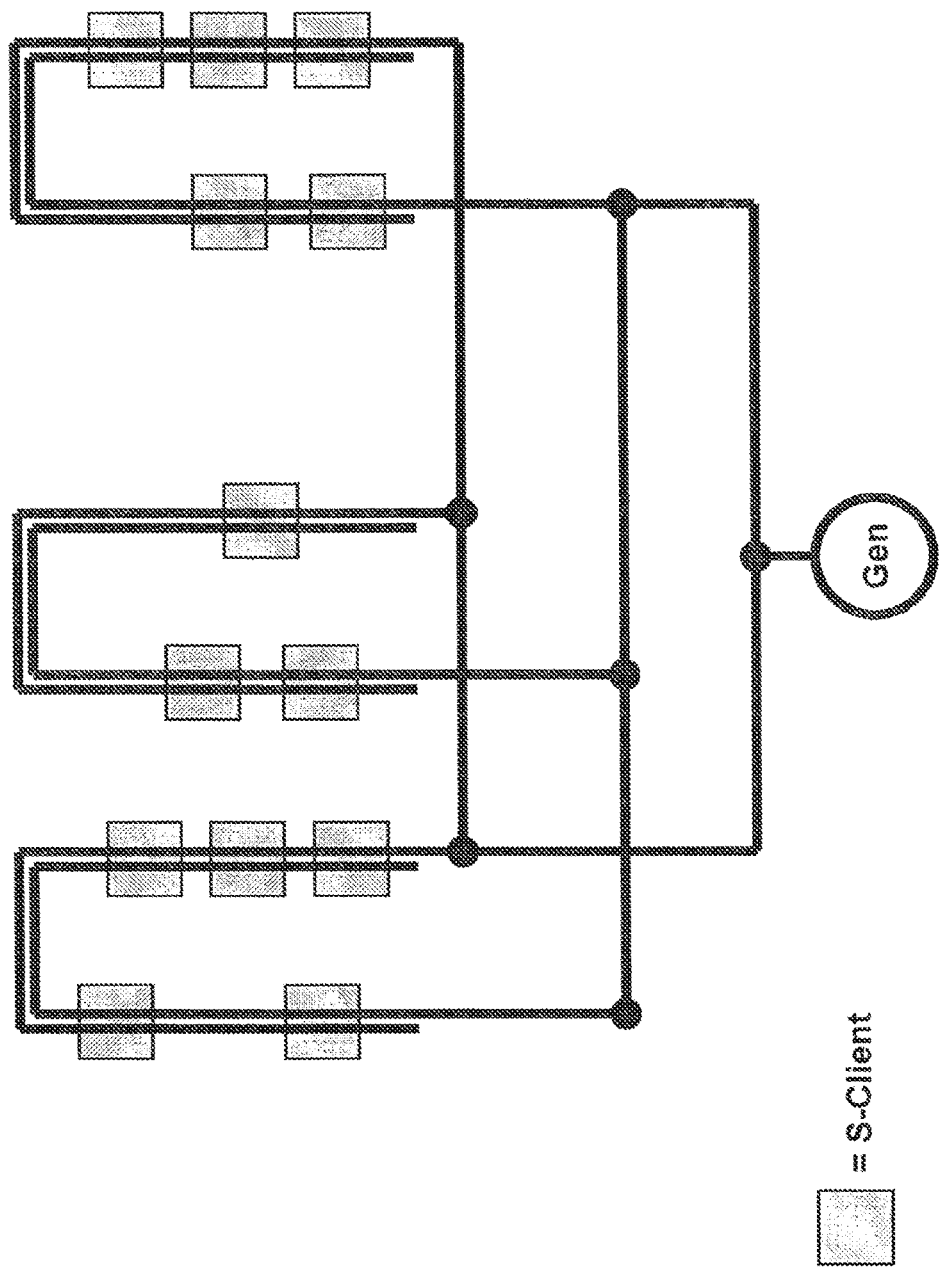
FIG. 11 illustrates a schematic diagram of a synchronization system having a single generator in accordance with an embodiment of the present invention.
Figure 12:
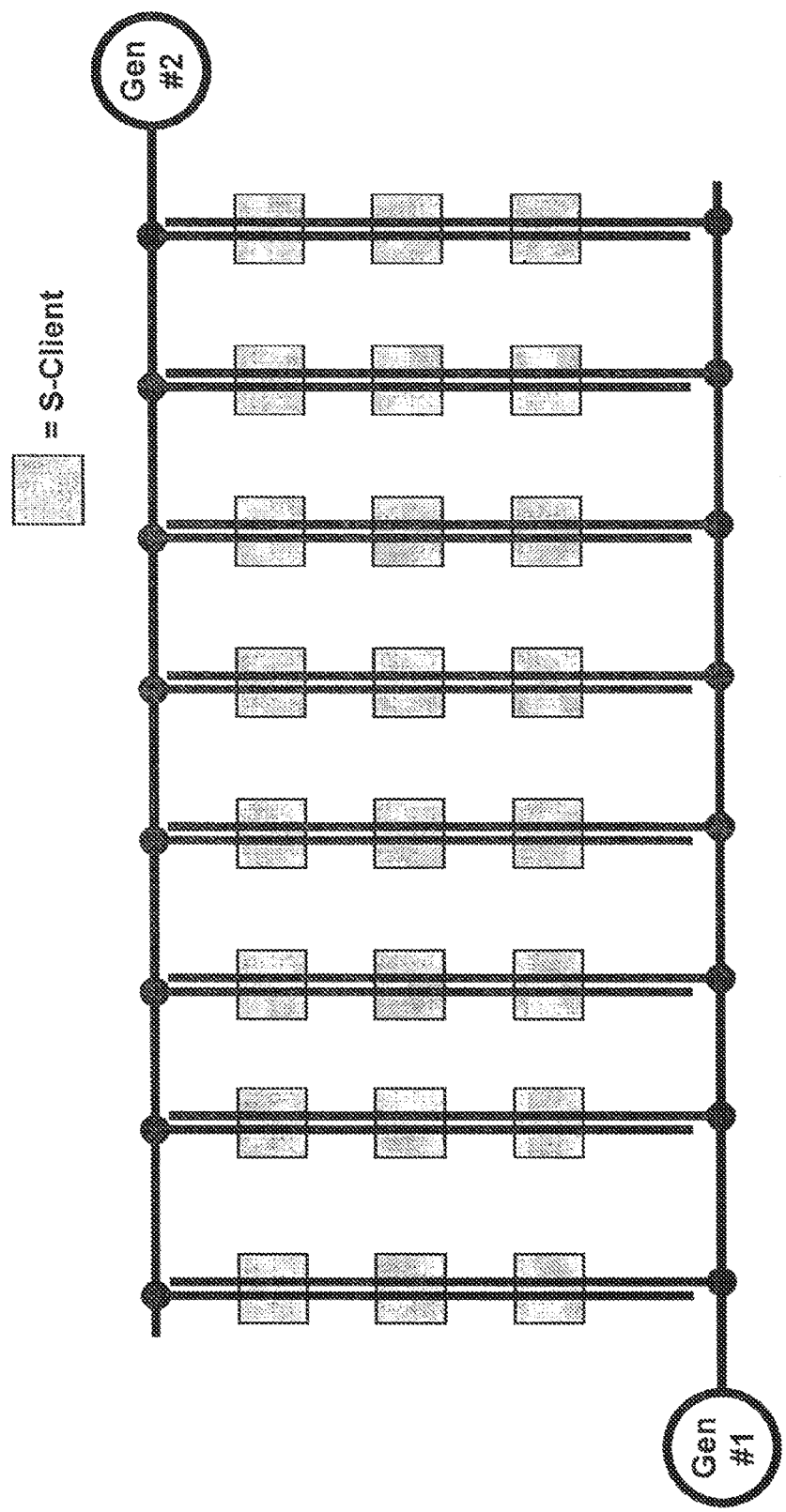
FIG. 12 illustrates a schematic diagram of a synchronization system having physically separated tree trunks depicting a two dimensional Cartesian system in accordance with an embodiment of the present invention.
Figure 13:
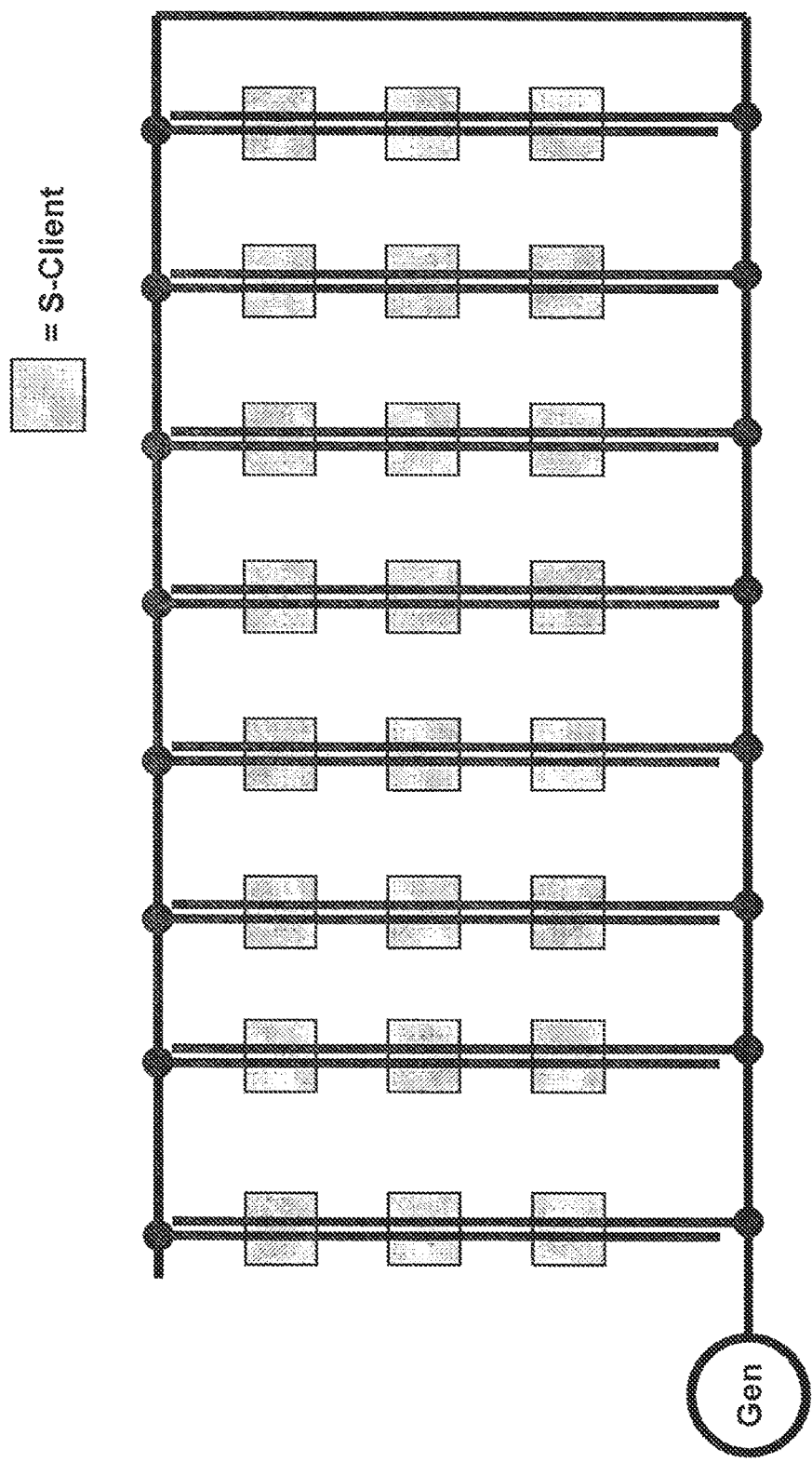
FIG. 13 illustrates a schematic diagram of a synchronization system having a a Cartesian system with physically separated tree trunks in accordance with an embodiment of the present invention.

FIG. 9 depicts an embodiment of the ATAC circuit functionality, which still achieves global output phase synchronization. SFT is a system invariant. Therefore, any function of SFT is also an invariant. For this reason, in general one can use any client circuit producing an output, which is a function of SFT, to obtain global phase synchronization. For clarity, the term "function" here refers not to any specific formula but rather to the general mathematical concept associating a single value for every element (e.g., number) from a fixed set.

A circuit implementing a function of SFT is called Synchronization Client or "S-Client". For example, the S-Client functionality in FIG. 9 adds a constant time delay to the average pulse-arrival-time. ATAC circuits are particular cases of all possible S-Clients. A simple S-Client, which is not an ATAC circuit, would be a DLL (Delay Locked Loop) locking at a constant time offset from the average pulse arrival times, as per functionality in FIG. 9. The constant time delay $\Delta T$ may be derived from the period of the pulse trains traveling over the two networks. Other examples of S-Clients for the case when sinusoidal signals are used as analog multipliers can be found in NRAO, A Proposal for a Very Large Array Radio Telescope, Vol. II, National Radio Astronomy Observatory, Green Bank, West Va., Ch. 14, 1967; and Richard R Goulette "Technique for Distributing Common Phase Clock Signals" U.S. Pat. No. 6,531,358 B1, May 13, 2003, the disclosures of which are incorporated herein by reference in their entirety. Other examples include analog multipliers with phase offsets.

The system in FIG. 2 has yet another important potential capability, i.e., the possibility of individually shifting the phases of client outputs with respect to the carrier. There are two ways this can be accomplished. One way is to use different S-Clients, which would implement different functions of SFT, still preserving an underlying absolute time reference. For example, one could use DLL clients with variable locking positions with respect to the input pulses. A second method for phase shifting the client outputs is by introducing delays or phase shifts at the branch or trunk coupling. This would give the capability of shifting the extracted carrier phase for a whole branch with respect to other branches. This may be useful in antenna array applications, e.g., for azimuth or altitude only beam steering.

Other Single-Frequency Systems with Two-Level Trees

Figure 14:
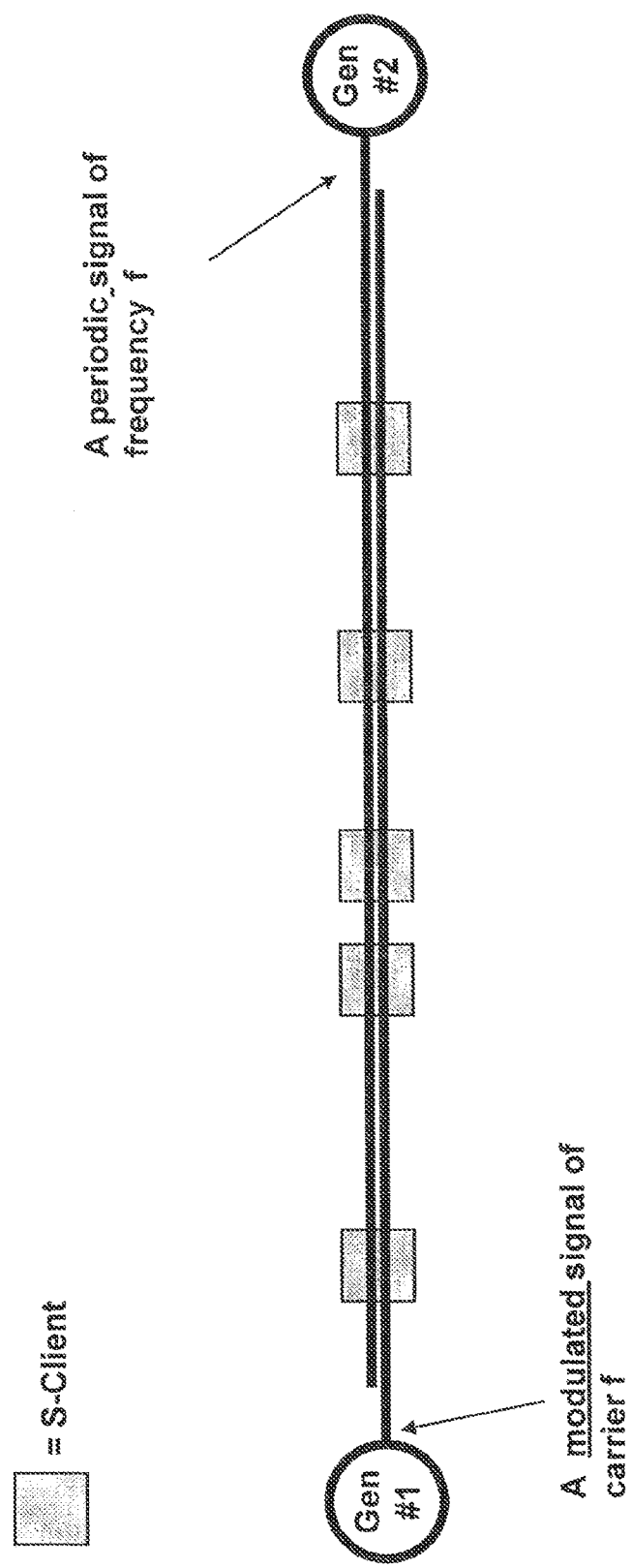
FIG. 14 illustrates a schematic diagram of a synchronization system having no tree branches and two generators, one generator being modulated, in accordance with an embodiment of the present invention.
Figure 15:
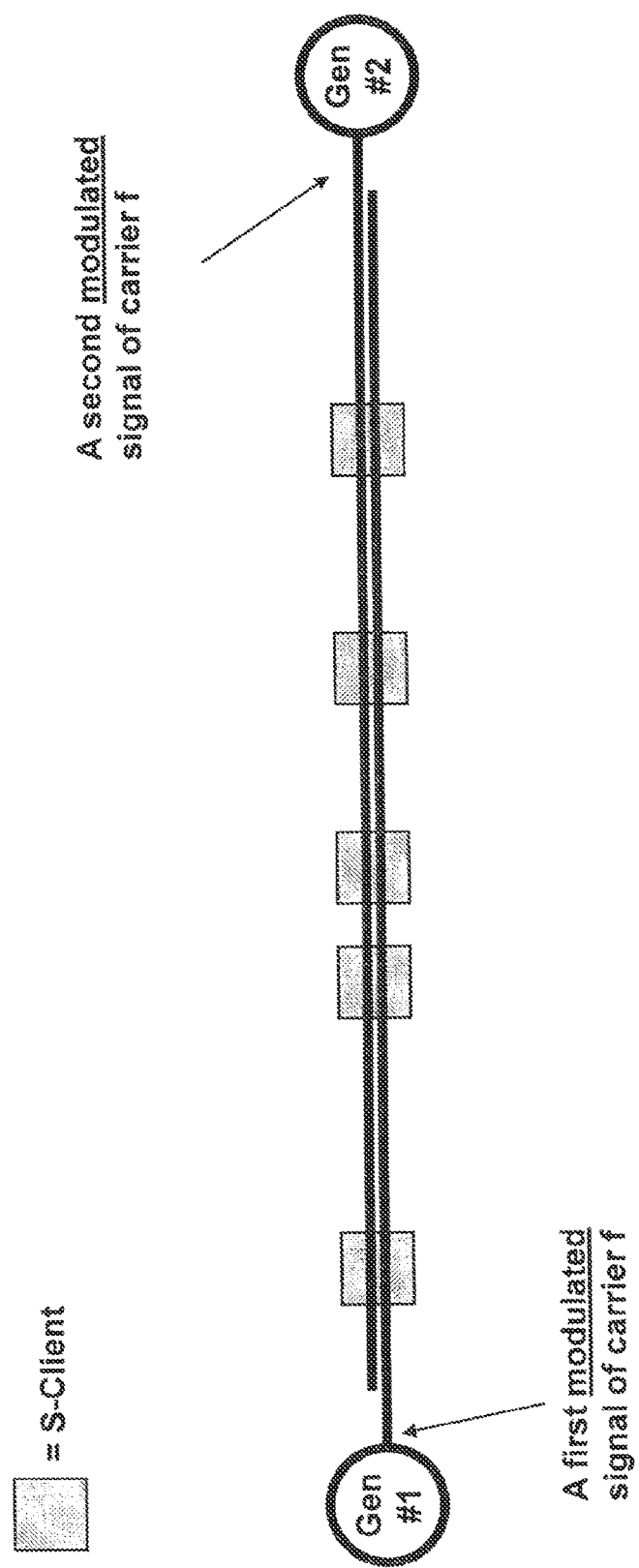
FIG. 15 illustrates a schematic diagram of a synchronization system having no tree branches and two generators, both generators being modulated, in accordance with an embodiment of the present invention.
Figure 16:
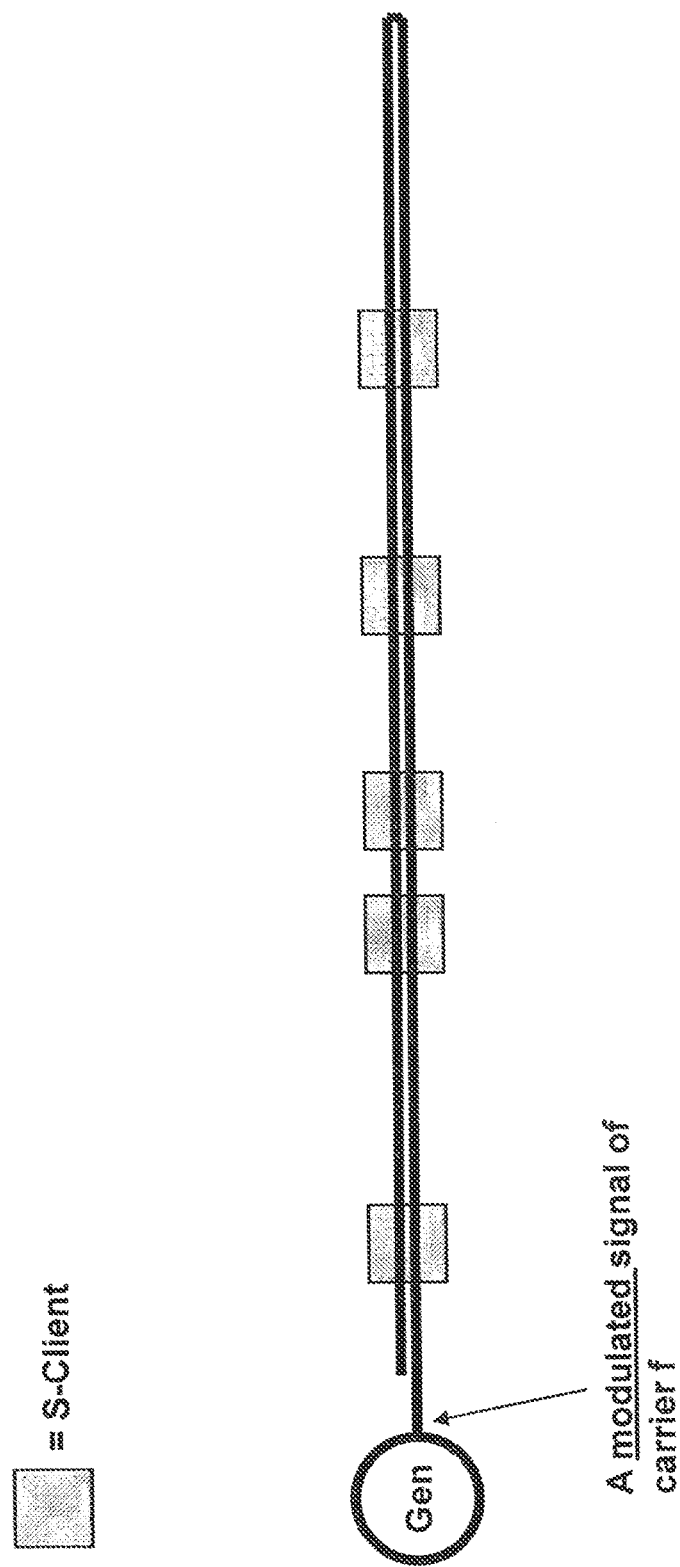
FIG. 16 illustrates a schematic diagram of a synchronization system having no tree branches and a single modulated generator in accordance with an embodiment of the present invention.

The system in FIG. 2, which has been used to introduce embodiments of the present invention can be extended into many variations. FIGS. 10-16 depict a non-exhaustive list of examples. FIGS. 10-13 show systems using a single generator. In these cases, the second trees are connected to the trunks of the respective first trees. FIGS. 14-16 show cases of systems only with trunks and no branches.

Embodiments of the present invention include many advantages over the disclosed related art. For example, instead of being restricted to using simple serial connections, embodiments of this invention use specially designed tree networks. The replacement of pure serial links with these tree networks accomplishes a great reduction in total transmission line length, with a similar reduction of the signal loss. This is particularly important in VLSI applications, where it is difficult to design very long low-loss transmission lines of small widths and reasonably high characteristic impedance. The use of trees as contemplated by embodiments of the present invention is different from the use of trees in the classical signal distribution because at least there is no requirement for equal time of flight from the tree root to the top of the tree and there are no geometrical restrictions.

Furthermore, instead of using only periodic signals, embodiments of the present invention contemplate using any signals containing a carrier frequency, including non-periodic signals. This is important for the distribution or generation of carrier-synchronized modulated signals such as in active array transmitters. In addition, this has an application in VLSI clock distribution with low EMI SFT is identified as the fundamental system invariant and the fundamental absolute time unit. All synchronization aspects are derived from SFT. As a result, any function of SFT provides a valid timing reference. Related art recognized only the time arrival average as an absolute time reference. Therefore, embodiments of the present invention show a more general principle for the synthesis of synchronized carrier circuits.

Generalizing Single-Frequency Systems

Figure 17:
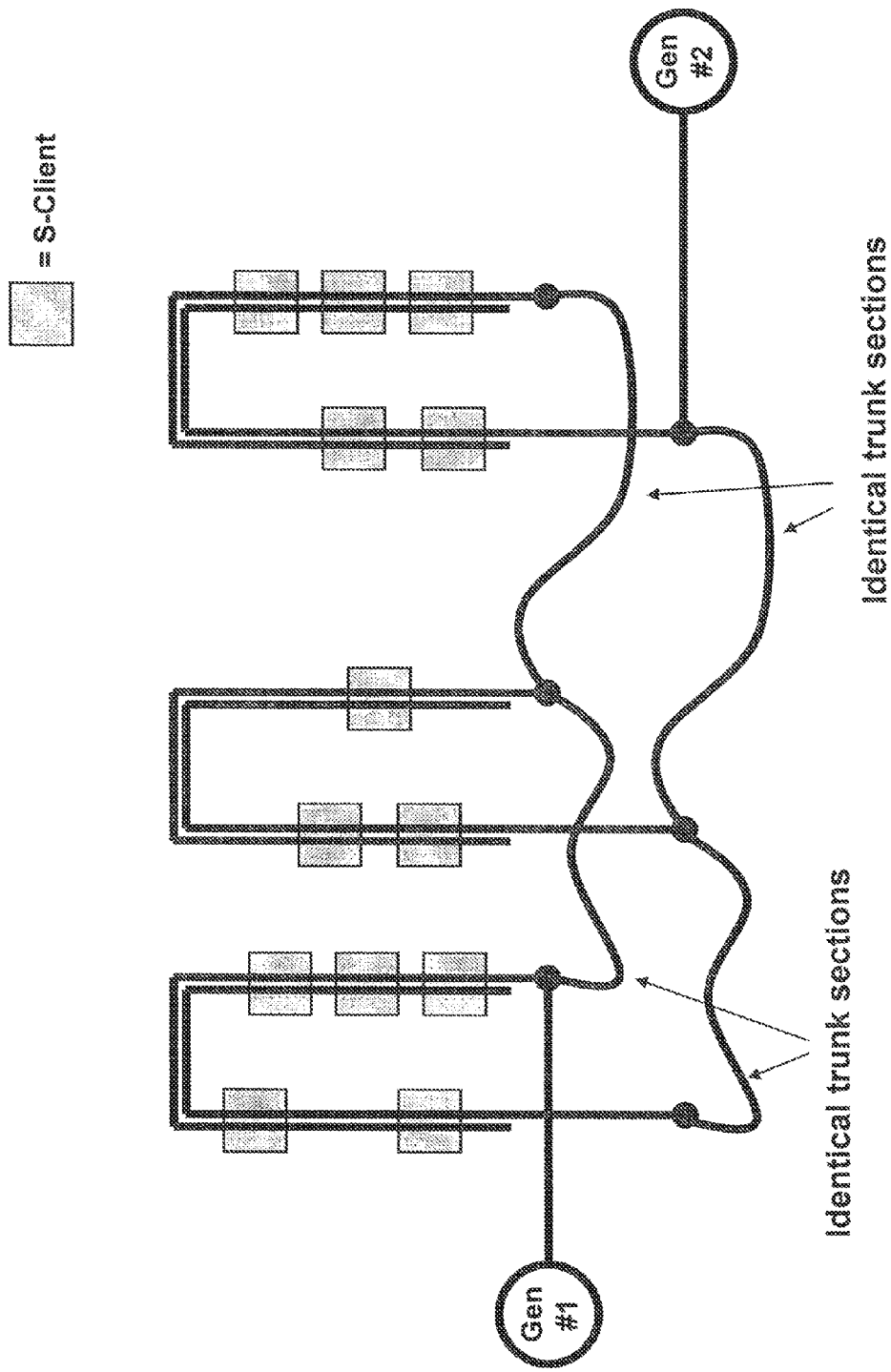
FIG. 17 depicts a schematic diagram of the synchronization system of FIG. 2 with "distorted" trunks in accordance with an embodiment of the present invention.
Figure 18:
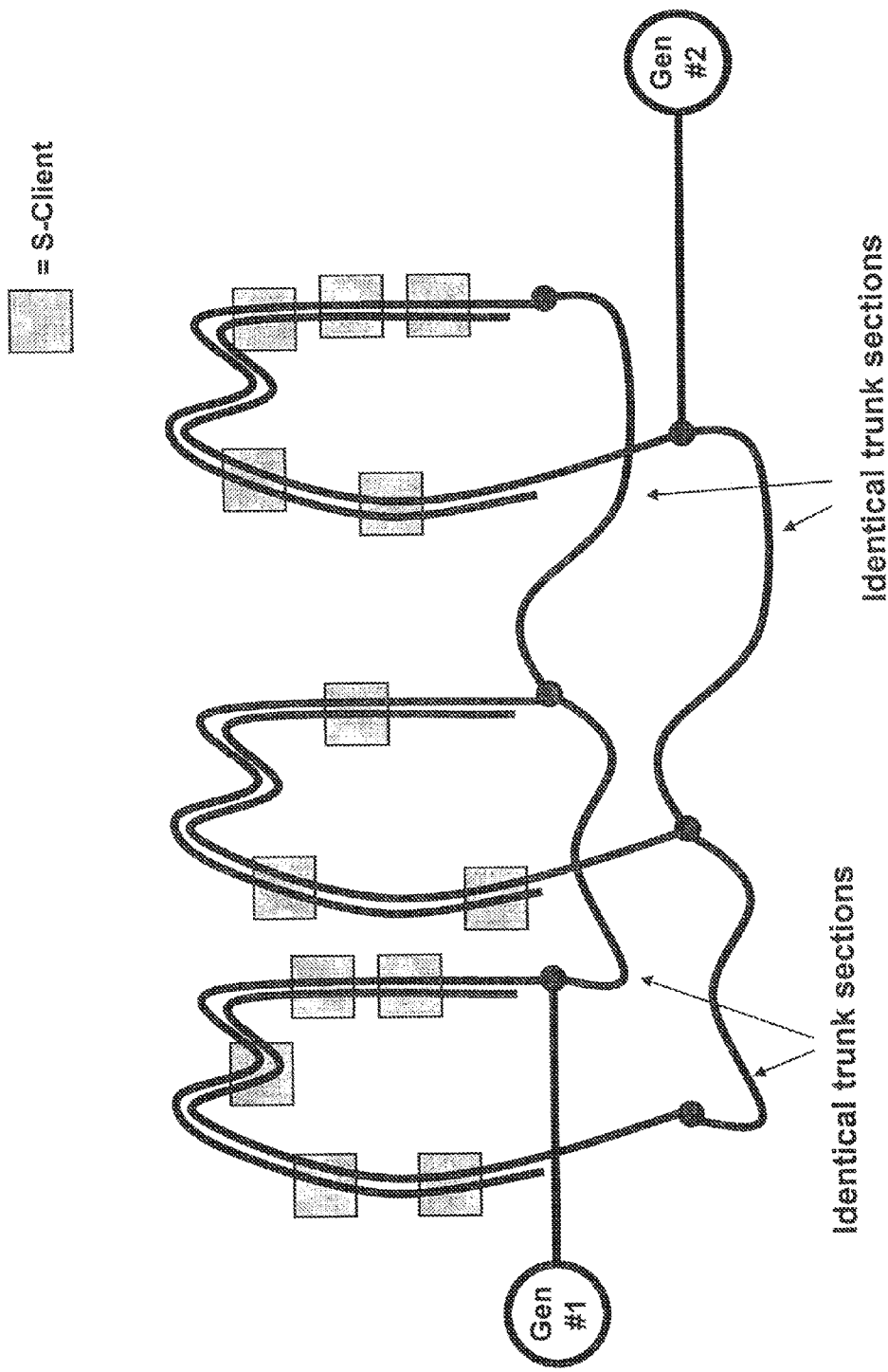
FIG. 18 depicts a schematic diagram of the synchronization system of FIG. 2 with "distorted" trunks and branches in accordance with an embodiment of the present invention.

A first generalization possibility of the system in FIG. 2 is shown graphically in FIGS. 17-18. Starting with the original system in FIG. 2 one can distort the trunks as in FIG. 17 with no consequences to the carrier synchronization of the client outputs. This is further illustrated based on the previous discussion regarding FIGS. 4-6. One effect of changing the trunk length or even distorting their physical shapes (as long as both trunks have the same section lengths) is a global timing reference shift. Similarly, as illustrated in FIG. 18 the same is true if all branches are distorted in length and shape.

The advantage that the physical shape of the trees is not essential is very valuable in practice and contemplated by the present invention. In the case of array synchronization, embodiments of the present invention contemplate conformal designs. Also, in the case of VLSI clock distribution, no constraints are imposed in terms of TL lengths and shapes, unlike distribution trees such as H-trees.

Figure 19:
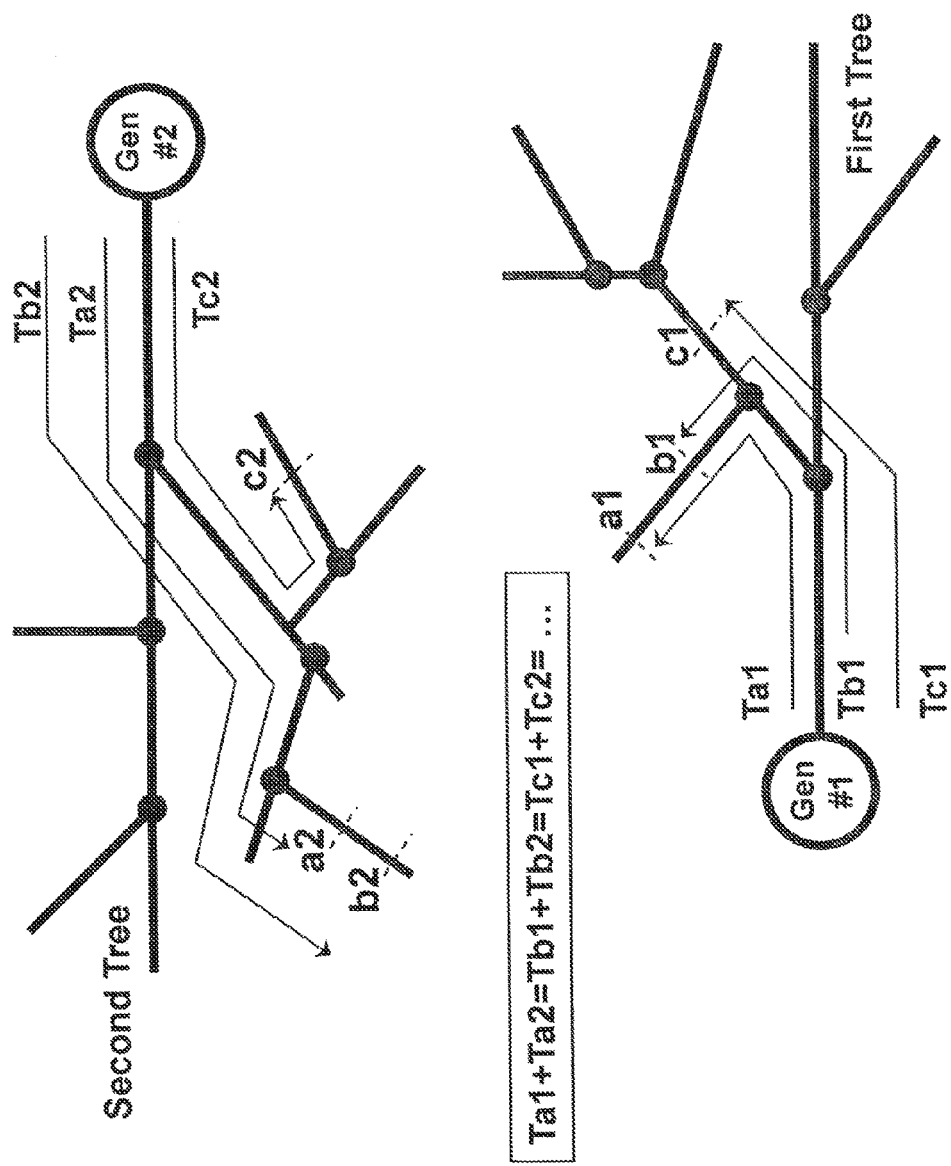
FIG. 19 depicts a schematic diagram of a synchronization system having two general tree networks with sensing points chosen such as to create Phase Synchronization Pairs (a1, a2), (b1, b2), (c1, c2) . . . (n1, n2) in accordance with an embodiment of the present invention.
Figure 20:
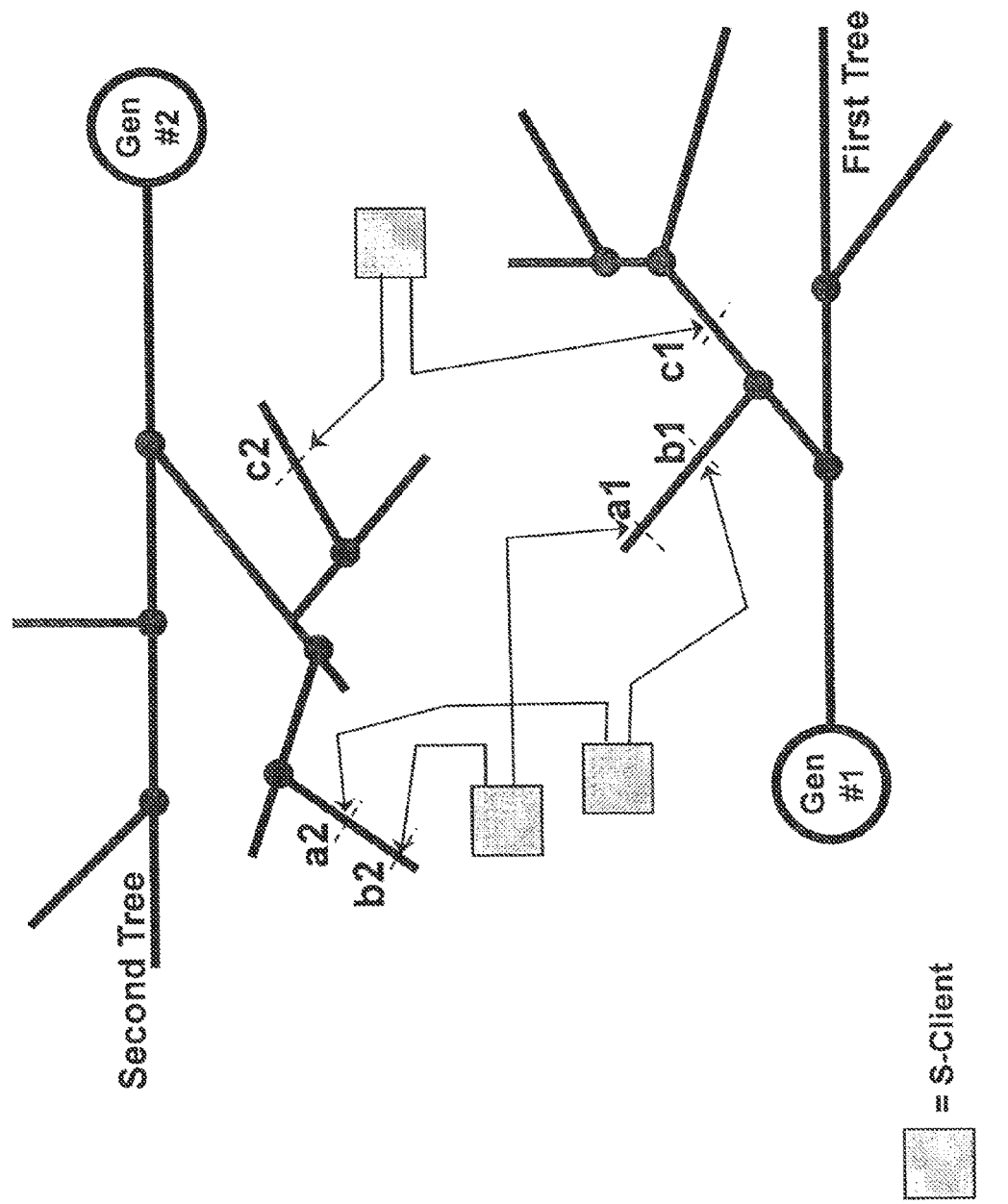
FIG. 20 depicts a schematic diagram of the tree networks from FIG. 19 with S-Client circuits added at the points of the Phase Synchronization Pairs (a1, a2), (b1, b2), (c1, c2), (n1, n2) in accordance with an embodiment of the present invention.

FIGS. 19-20 show additional embodiments of the present invention. In FIG. 19, there is depicted two trees, not equal in general, each tree having one trunk and any number of branches connected in any number of levels. A generator excites each tree trunk. One can choose pairs of tree points such that each pair contains a point from the first tree and a point from the second tree. These pairs are called phase synchronization pairs. Each phase synchronization pair has a unique SFT. In general, one can identify many phase synchronization points with the same SFT. For example, one can chose two points arbitrarily, one on each tree and form a first pair.

For this particular pair, there is a SFT calculated as the sum of the signal propagation time from the Generator #1 to the first tree point in the pair with the signal propagation time from the Generator #2 to the second tree point in the pair. Next, one can step away from the Generator #1 on the first tree and towards the Generator #2 on the second tree and find other point pairs with the same SFT. Moreover, one can search other branches and find additional pairs with the same SFT. Clearly, for any dual-tree network, there are many possible SFT and associated sets of tree point pairs. A set of synchronization pairs with the same SFT is called a collection of synchronization pairs.

FIG. 19 illustrates a collection of three phase synchronization pairs (a1, a2), (b1, b2), and (c1, c2).

Figure 21:
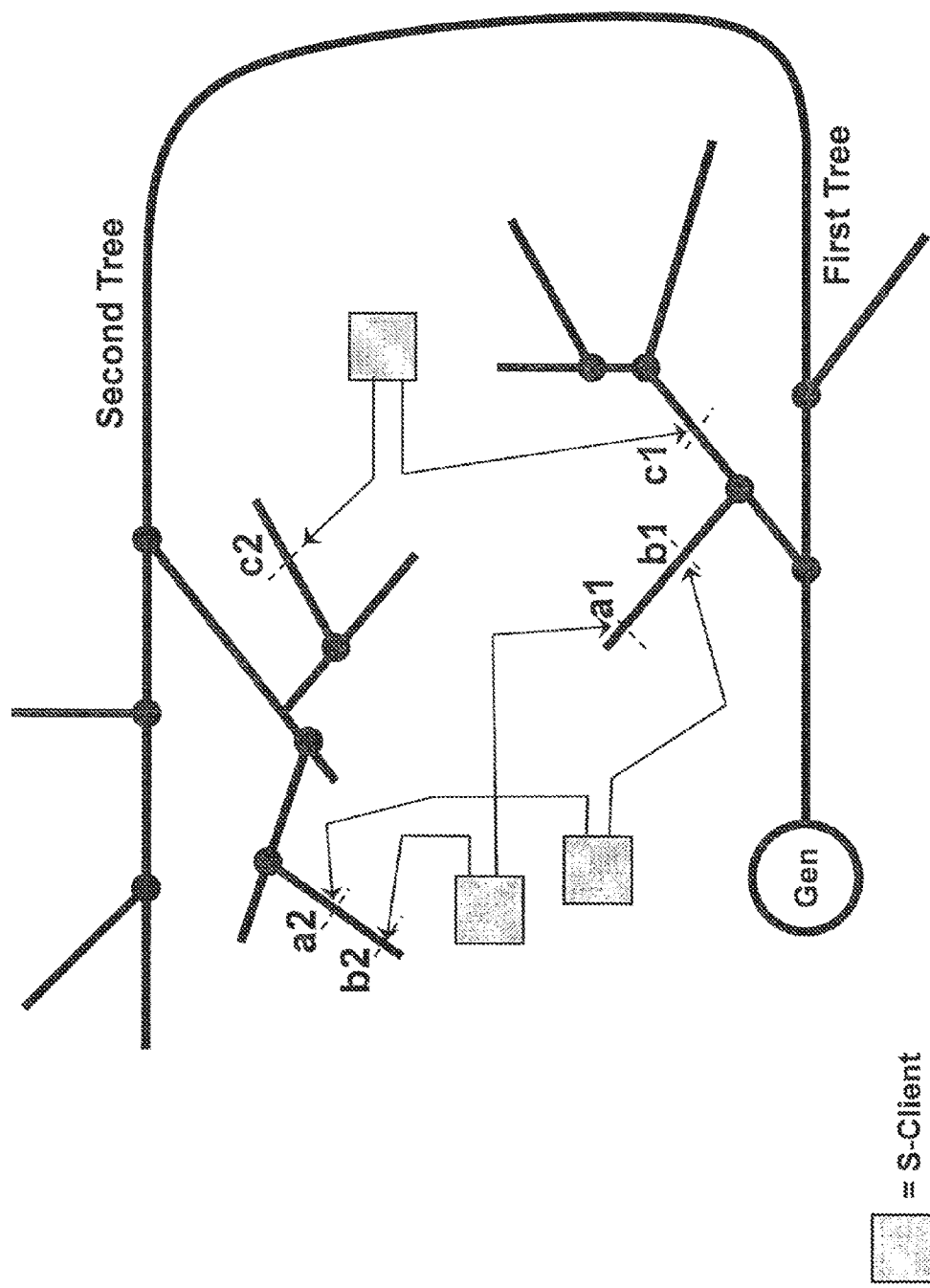
FIG. 21 depicts a schematic diagram of the general signal distribution principle of FIG. 20 using a single generator in accordance with an embodiment of the present invention.
Figure 22:
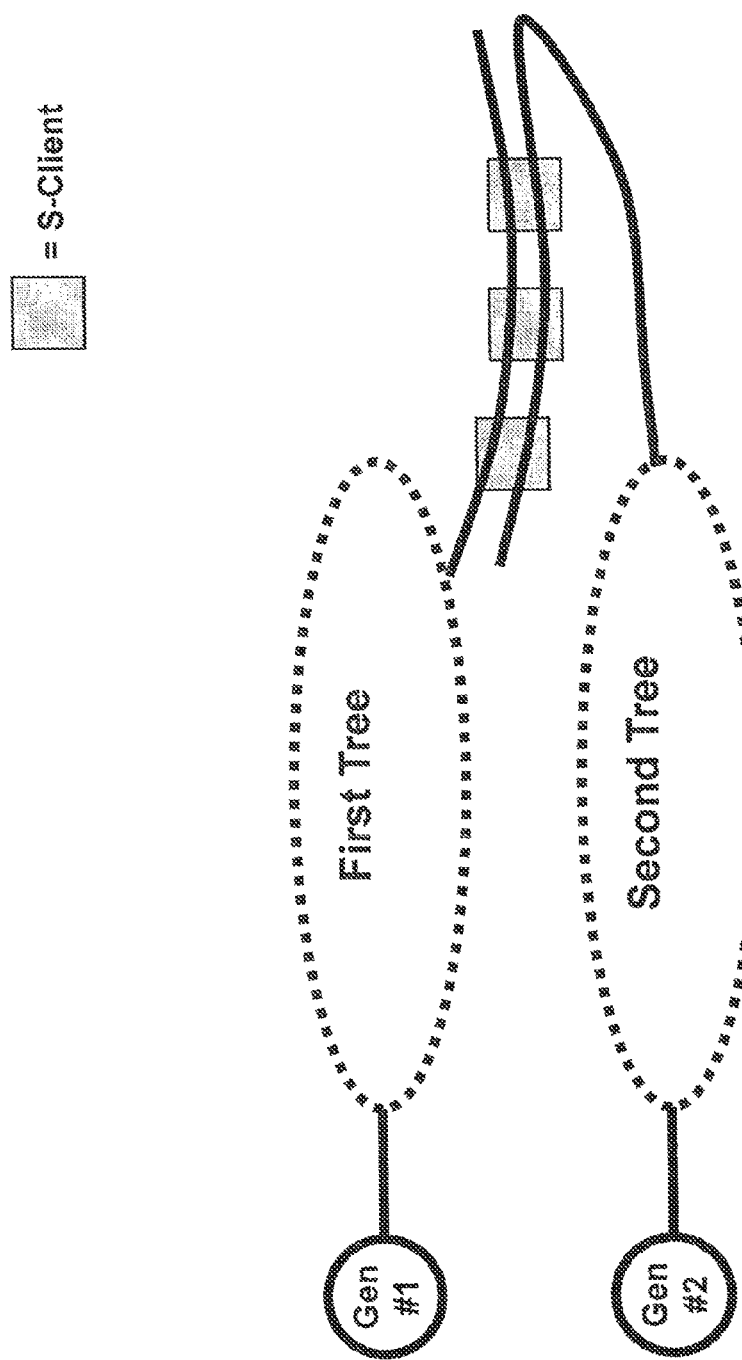
FIG. 22 depicts a schematic diagram of a method to implement the system of FIG. 20 having close points in all Phase Synchronization Pairs in accordance with an embodiment of the present invention.

FIG. 20 shows the addition of S-Client circuits to the network in FIG. 19 such that the SFT is used to extract an absolute time reference (generate signals with phase synchronous carriers). Naturally, just like before, one generator may be eliminated and the second tree coupled to the first tree. This possibility is shown in FIG. 21. The only difference between the cases in FIGS. 19-21 and the previous cases is that the S-Client circuits must have additional physical means to tap the signals on the phase synchronization pairs, as the respective tree branches may not be close to the each other in general. Therefore, the S-Client circuits are required to have long enough input terminals to reach all points, as necessary. A practical way to substantially ensure the phase synchronization pairs contain points close to each other is shown in FIG. 22 for just one pair of branches. The considered branch of the second tree is folded and placed in close proximity with the considered branch of the first tree.

Figure 23:
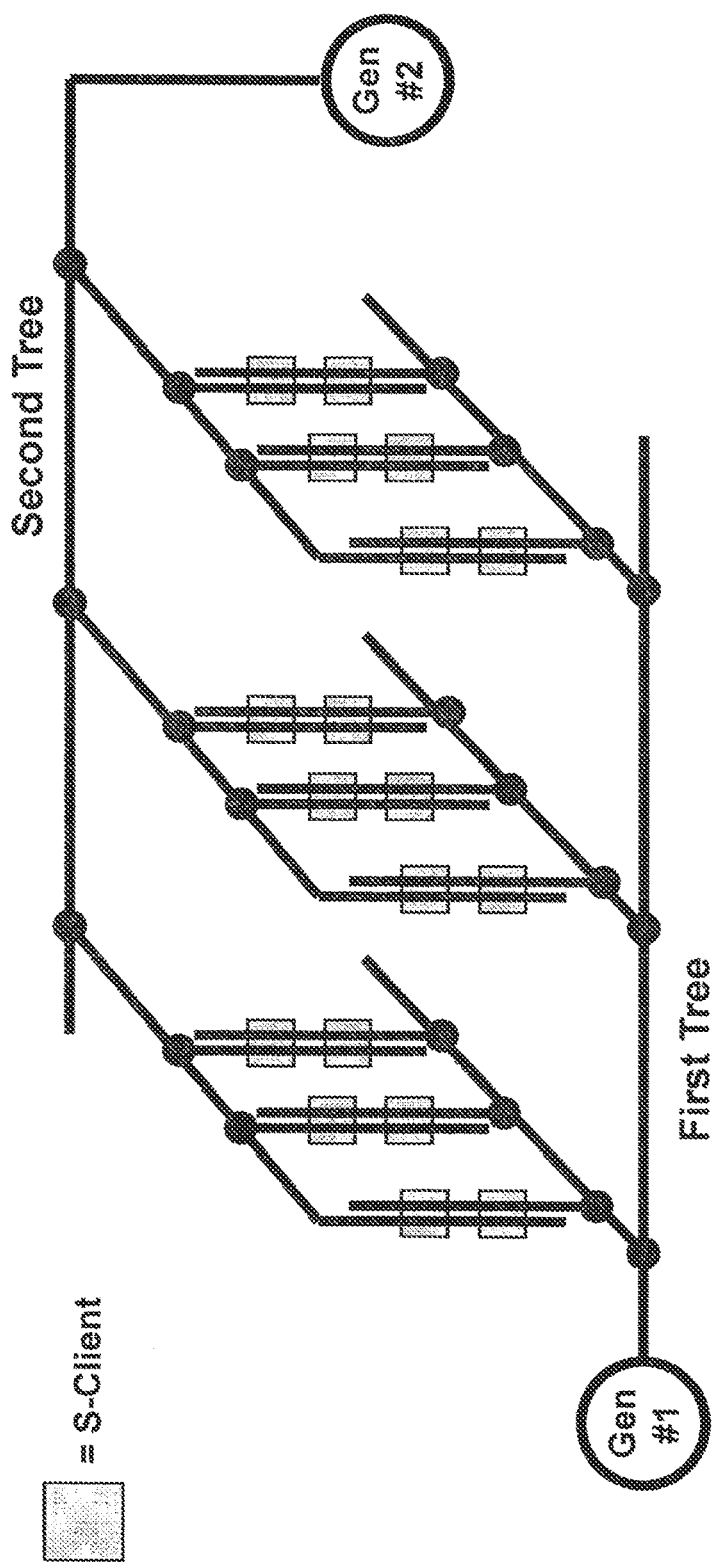
FIG. 23 depicts a schematic diagram of a three dimensional Cartesian synchronization system having two generators in accordance with an embodiment of the present invention.
Figure 24:
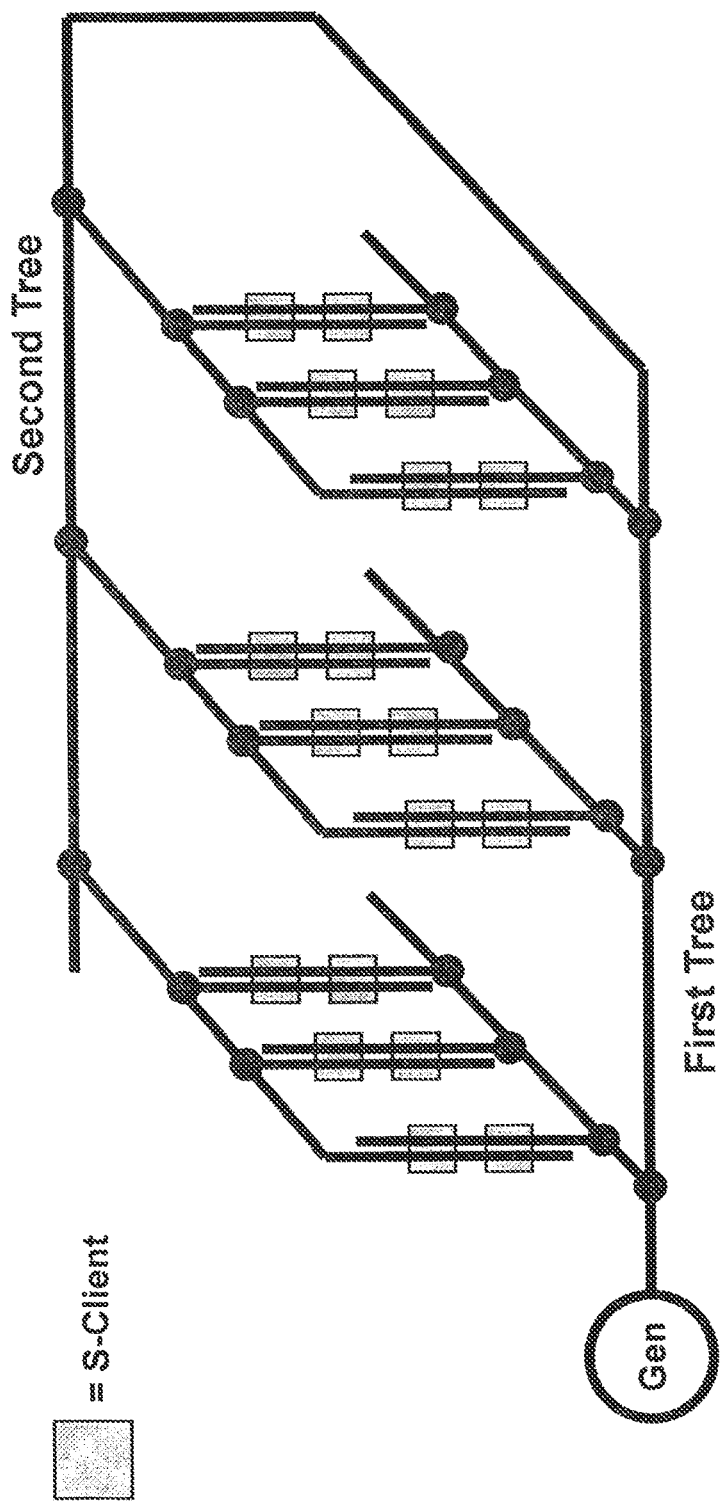
FIG. 24 depicts a schematic diagram of a three dimensional Cartesian synchronization system having a single generator in accordance with an embodiment of the present invention.

The general system in FIGS. 19-20 may be used to generate signals with phase synchronous carrier based only on a subset of points. In fact, in general the same network configuration is capable of generating many sets of carrier-synchronized outputs, each set using a specific collection of phase synchronization pairs. The network of FIG. 2 and the others based on it are special cases where all adjacent points on the tree branches placed next to each other form a collection of phase synchronization pairs. Three-dimensional extensions called Cartesian systems are shown in FIG. 23 using two generators and in FIG. 24 using a single generator. In a consistent manner with this definition, the system of or FIG. 2 or FIG. 12, etc. are two-dimensional Cartesian systems.

Collections of phase synchronization points with different SFTs can yield identical S-Client outputs. For example, if the S-clients are analog multipliers (sinusoidal signals case), all collections of phase synchronization points with SFTs, which are different by an integer number of the signal period generate identical S-Client outputs. The reason for this is that the waves propagating on the two tree networks create periodic signals in space as well as in time.

In the previous cases, tree networks without signal reflections, i.e. networks in which the trunk and branches are properly terminated, were considered. This is particularly important in the embodiments using pulse signaling. If signal reflections were allowed, the existence of multiple reflected pulses in the networks could easily impede the operation of the S-Clients. In the case of sinusoidal signaling, the existence of reflections produces only phase and magnitude changes. Assuming there is no use of the points where the signal magnitudes are too small, the phase changes could be mitigated by selecting different taping points on the networks.

Therefore, in the most general case, the phase synchronization pairs can be selected not on the basis of signal travel times as before but rather on a specific relationship between the signal phases. For example, such a relationship could be a constant average phase. In addition, the two networks could be any networks not necessarily tree networks.

Figure 36:
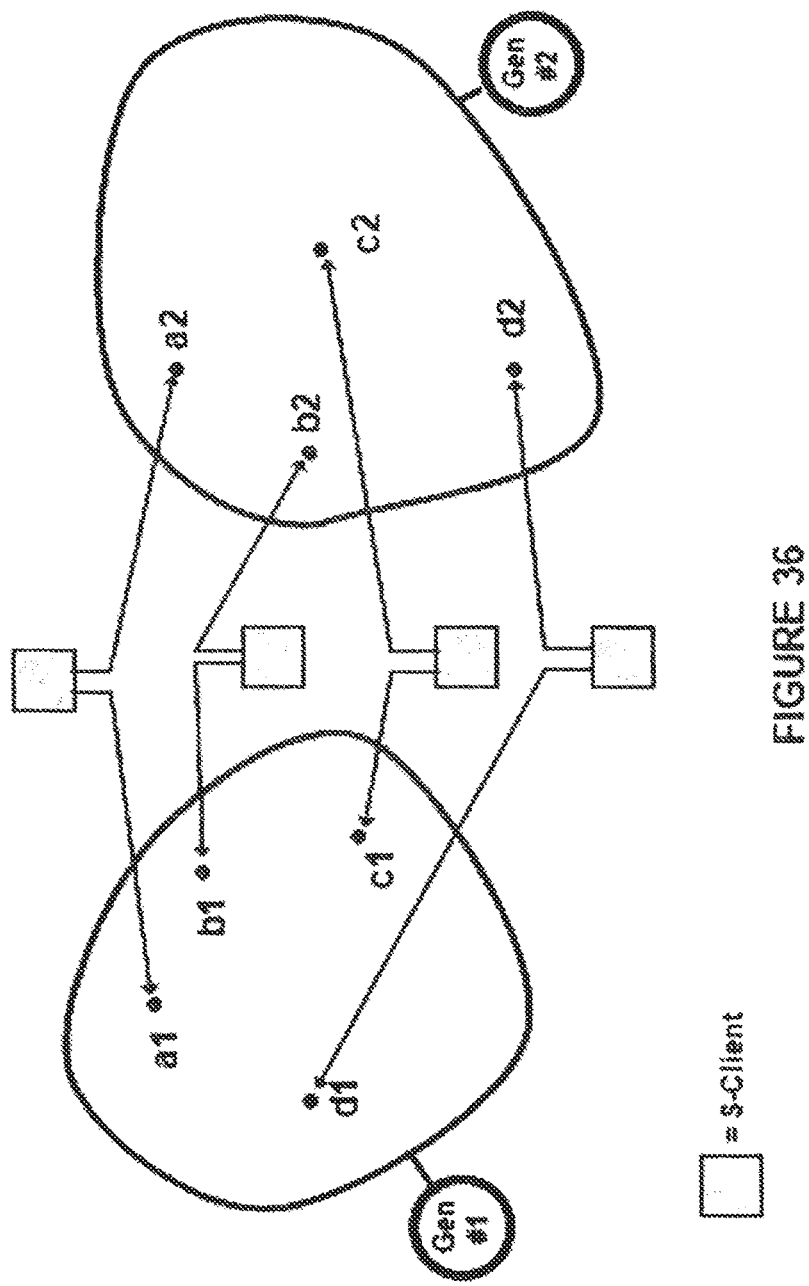
FIG. 36 depicts a schematic diagram of a synchronization system with two networks of any topology and phase synchronization pairs (a1, a2), (b1, b2), (c1, c2), (d1, d2) selected based on signal phase relationships in accordance with an embodiment of the present invention.

FIG. 36 shows this general case, where the point pairs (a1, a2), (b1, b2), (c1, c2), and (d1, d2) are selected such that the signal phases add to a constant or have a constant average, etc. The S-Clients could be analog multipliers. The outputs of the S-Clients are phase synchronized carriers.

Figure 37:
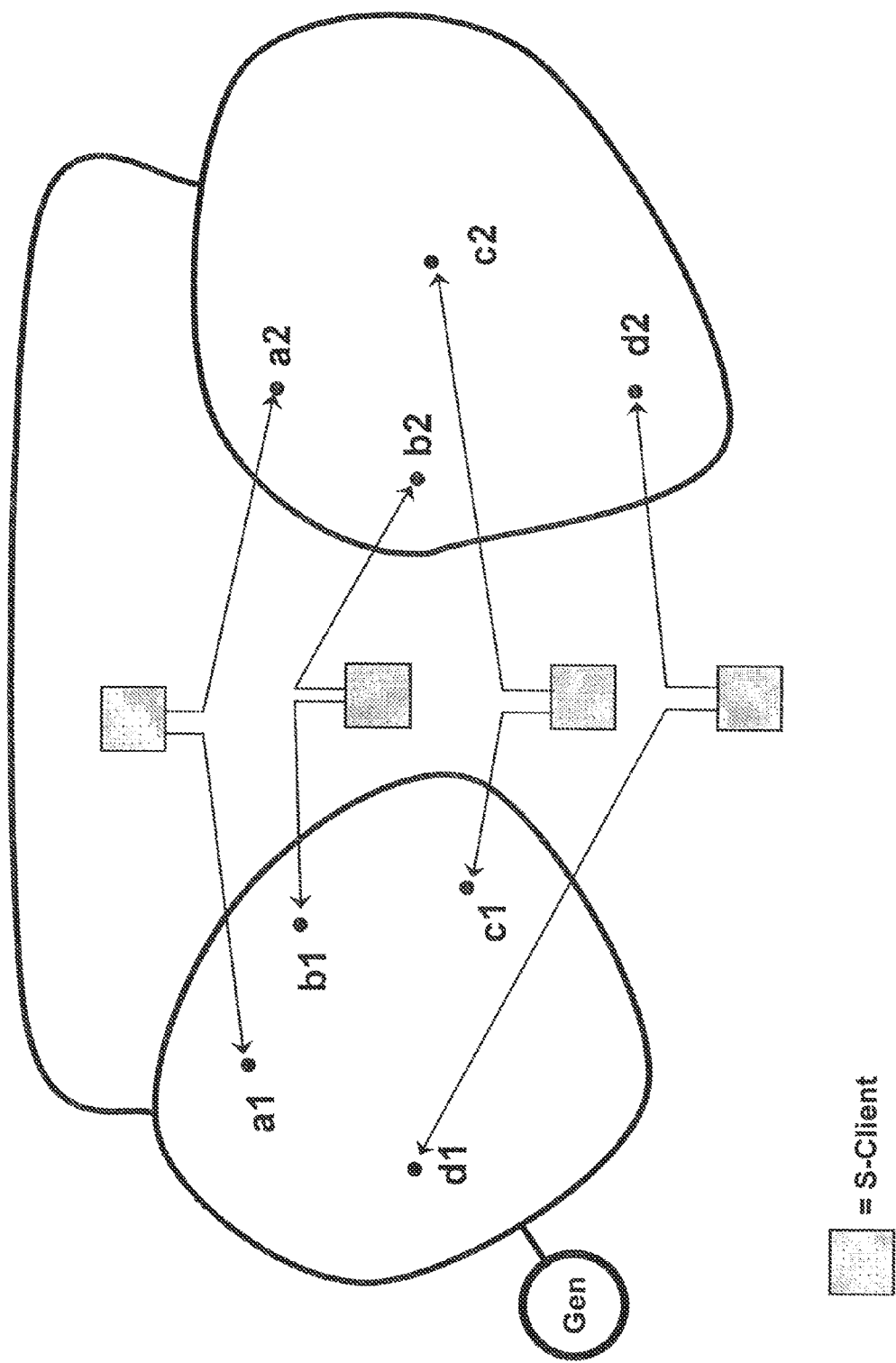
FIG. 37 depicts a schematic diagram of the synchronization system of FIG. 36 with a single generator in accordance with an embodiment of the present invention.

FIG. 37 shows this embodiment of the present invention with a single generator, where one of the networks is excited by a signal tapped from the other network.

Two Frequency Systems

Figure 25:
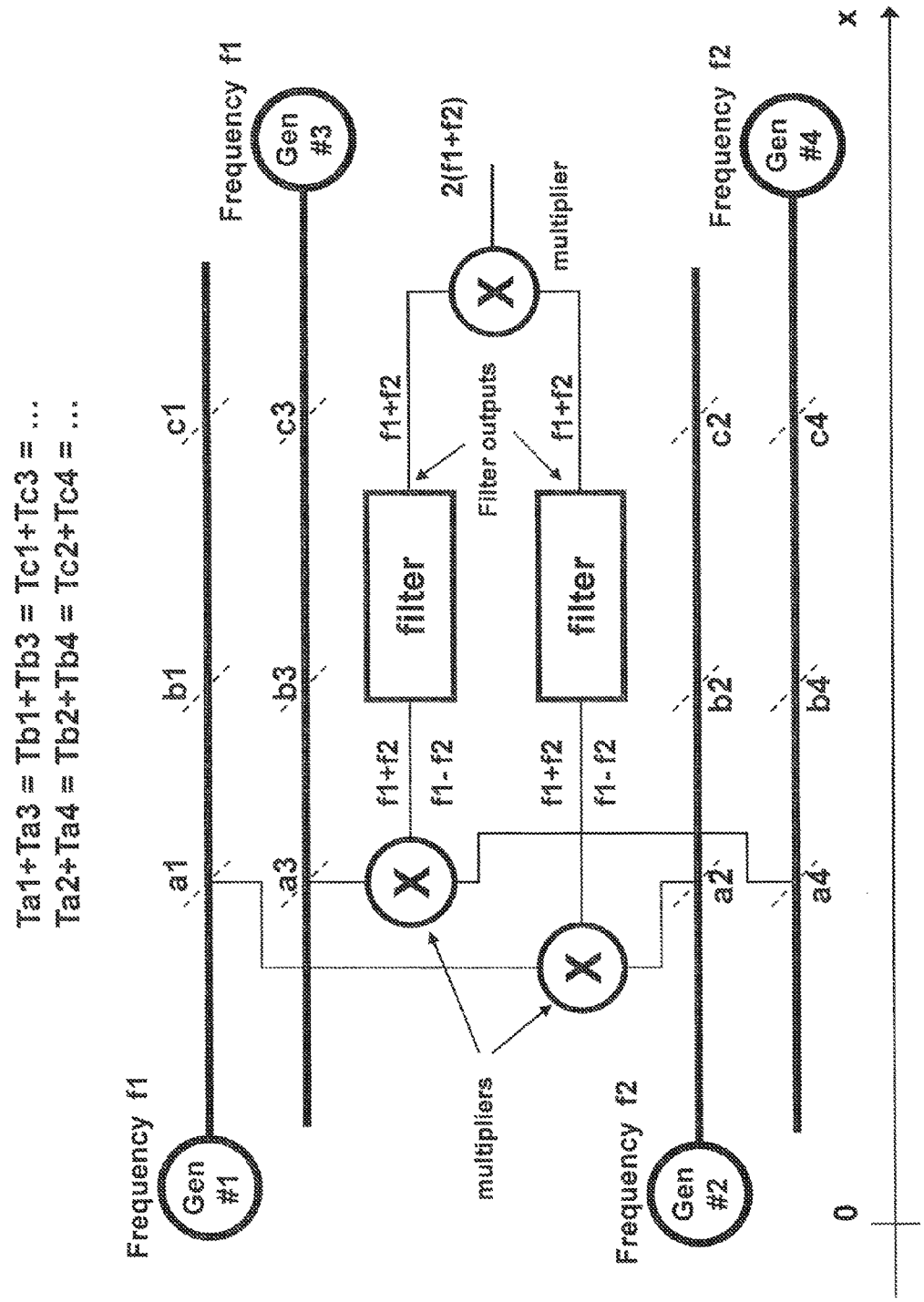
FIG. 25 depicts a schematic diagram of a two frequency synchronization system with four trunks and four generators in accordance with an embodiment of the present invention.

Embodiments of the present invention contemplate applying the above discussions to two frequencies and two system SFTs. The simplest example is shown in FIG. 25. Four trees with only trunks and no branches are excited by four respective generators. The signals traveling on the first and third trunks placed next to each other have the carrier frequency f1 and the signals traveling on the second and fourth trunks placed next to each other have the carrier frequency f2. The propagating speed of all signals over the trunks is assumed constant independent of frequencies f1 and f2. This assumption is reasonable in practice if the frequencies f1 and f2 are not too different or if the transmission lines have low dispersion.

The first and third trees in FIG. 25 considered as a pair have a system SFT called SFT1 for the collection of phase synchronization pairs (a1, a3), (b1, b3), (c1, c3) and the second and fourth trees considered as a pair have a system SFT called SFT2 for the collection of phase synchronization pairs (a2, a4), (b2, b4), (c2 c4). The S-Client circuit in this case is formed by two analog multipliers tapping the tree signals as shown in FIG. 25, two filters, and a third analog multiplier multiplying the filter outputs. A simple trigonometric calculation reveals that the resulting carrier at frequency $2(f1+f2)$ is independent of position, as shown next.

At any coordinate x, the four signals are:

$$S1(t) = A1 \sin[(x/c-t)\omega 1 + \phi 1] \tag{6a}$$

$$S2(t) = A2 \sin[(x/c-t)\omega 2 + \phi 2] \tag{6b}$$

$$S3(t) = A3 \sin[(x/c+t)\omega 1 + \phi 3] \tag{6c}$$

$$S4(t) = A4 \sin[(x/c+t)\omega 2 + \phi 4] \tag{6d}$$

The signals S1(t) and S2(t) travel in one direction and the signals S3(t) and S4(t) travel in opposite directions with the same speed c (speed of light in the TL). The relations (6) are written with respect to the angular frequencies $\omega 1$ ($2\pi$ f1) and $\omega 2$ ($2\pi$ f2) and any initial phases $\phi 1, \phi 2, \phi 3, \phi 4$. Multiplying relations (6a) with (6b) and (6c) with (6d) we obtain:

$$S1(t)S2(t) = (\tfrac{1}{2})A1\,A2\cos[(x/c-t)(\omega 1-\omega 2)+(\phi 1-\phi 2)] - (\tfrac{1}{2})A1A2\cos[(x/c-t)(\omega 1+\omega 2)+(\phi 1+\phi 2)] \tag{7a}$$

$$S3(t)S4(t) = (\tfrac{1}{2})A3\,A3\cos[(x/c+t)(\omega 1-\omega 2)+(\phi 3-\phi 4)] - (\tfrac{1}{2})A3\,A4\cos[(x/c+t)(\omega 1+\omega 2)+(\phi 3+\phi 4)] \tag{7b}$$

The filters in FIG. 25 reject the undesirable (f1-f2) components, and after multiplying the remaining (f1+f2) terms in (7a) and (7b), we get:

$$S1(t)S2(t)S3(t)S4(t) = (\tfrac{1}{4})A1\,A2\,A3\,A4\cos[2(\omega 1+\omega 2)t+(\phi 3+\phi 4-\phi 1-\phi 2)] + (\tfrac{1}{4})A1A2\,A3\,A4\cos[2(x/c)(\omega 1+\omega 2)+(\phi 3+\phi 4+\phi 1+\phi 2)] \tag{8}$$

The first term in (8) is independent of position and the second term in (8) is a DC component, which can be removed easily.

The previous carrier synchronization effect can be explained even without calculations by observing that the order of multiplication can be reversed mathematically without changing the result (multiplication is commutative and associative). Therefore, first one can multiply the signals on the first and third trunks and those on the second and fourth trunks and then multiply the results. Carrying out the signal multiplication in this order is equivalent to having two cases as in FIG. 15, one with frequency f1 and the other with frequency f2, which yield synchronized carriers. Naturally, multiplying two synchronized carriers results in a third synchronized carrier.

Figure 26:
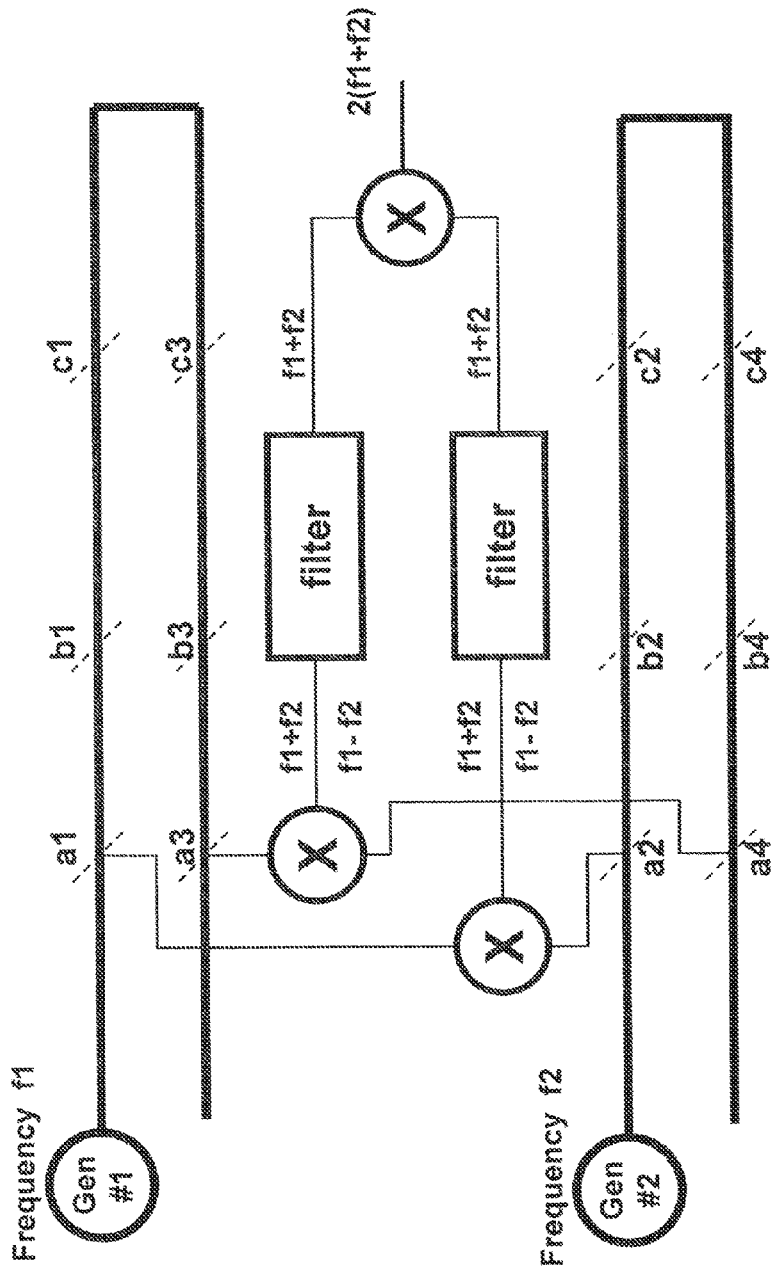
FIG. 26 depicts a schematic diagram of a two frequency system with four trunks and two generators in accordance with an embodiment of the present invention.
Figure 27:
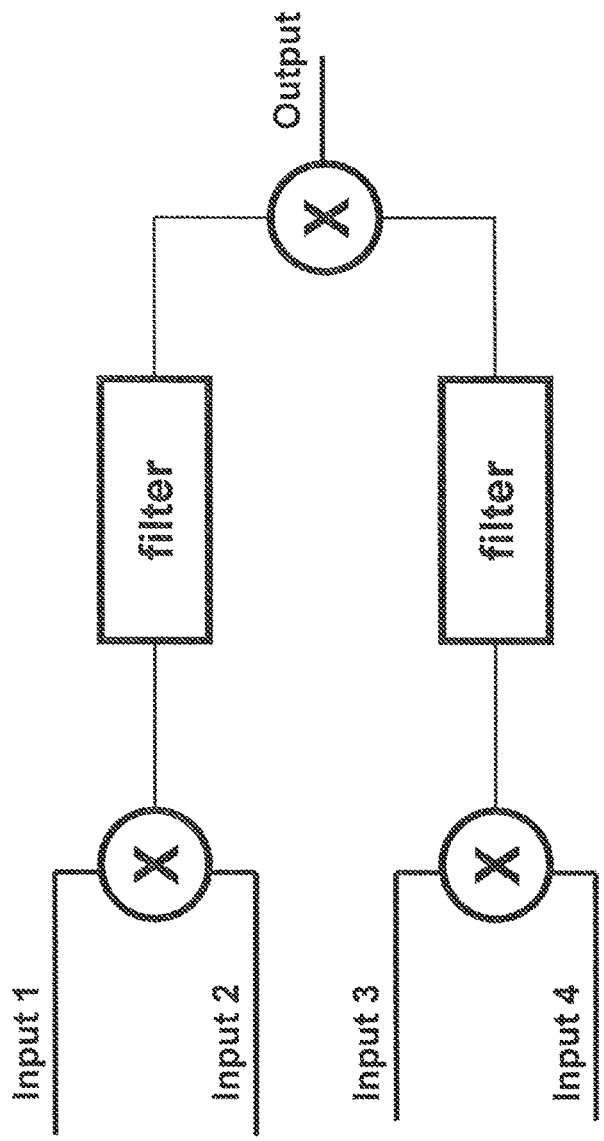
FIG. 27 depicts a schematic diagram of an S-Client circuit for the synchronization systems of FIGS. 25-26 in accordance with an embodiment of the present invention.
Figure 28:
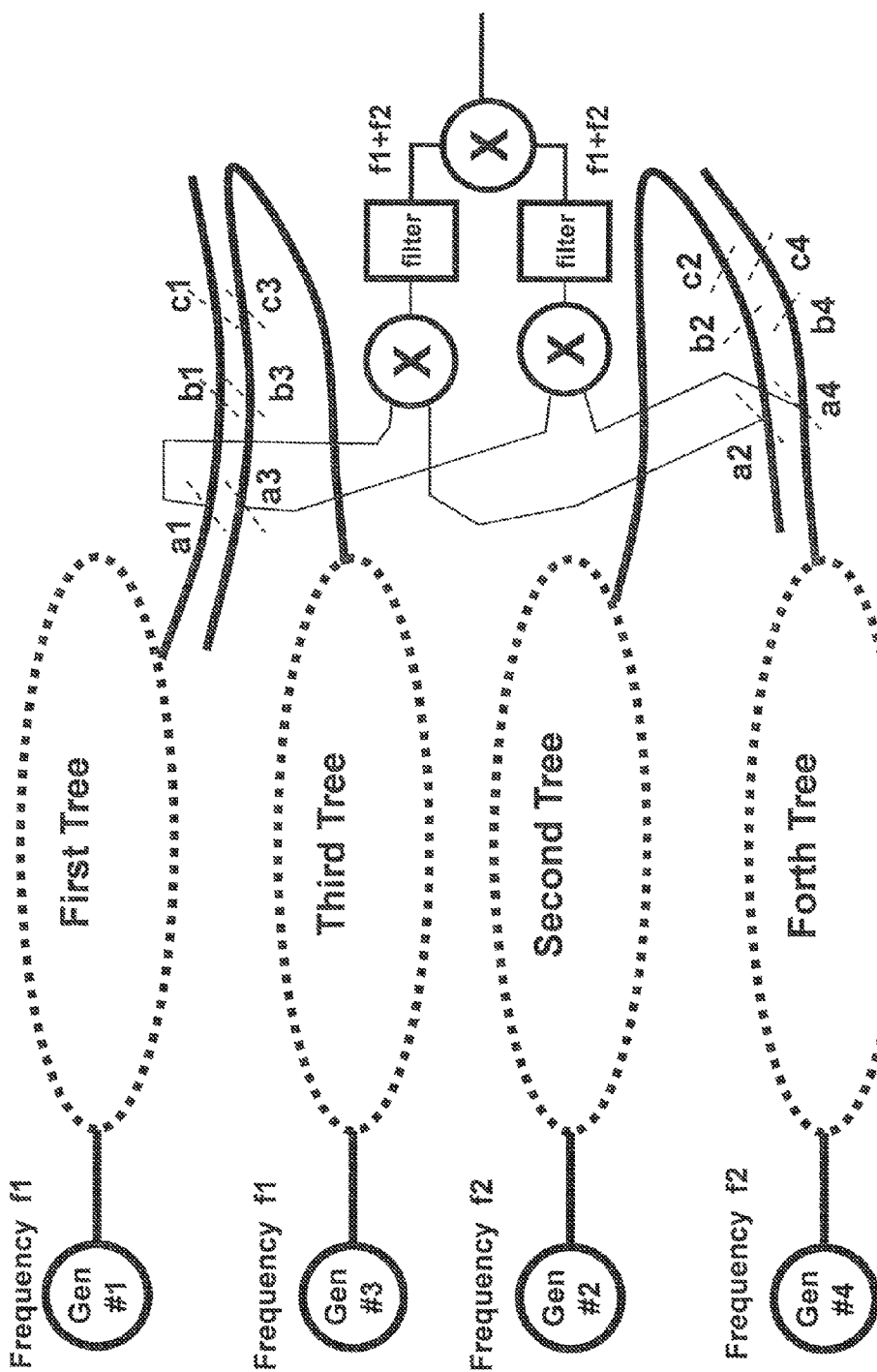
FIG. 28 depicts a schematic diagram of a two frequency system with four tree networks and four generators in accordance with an embodiment of the present invention.
Figure 29:
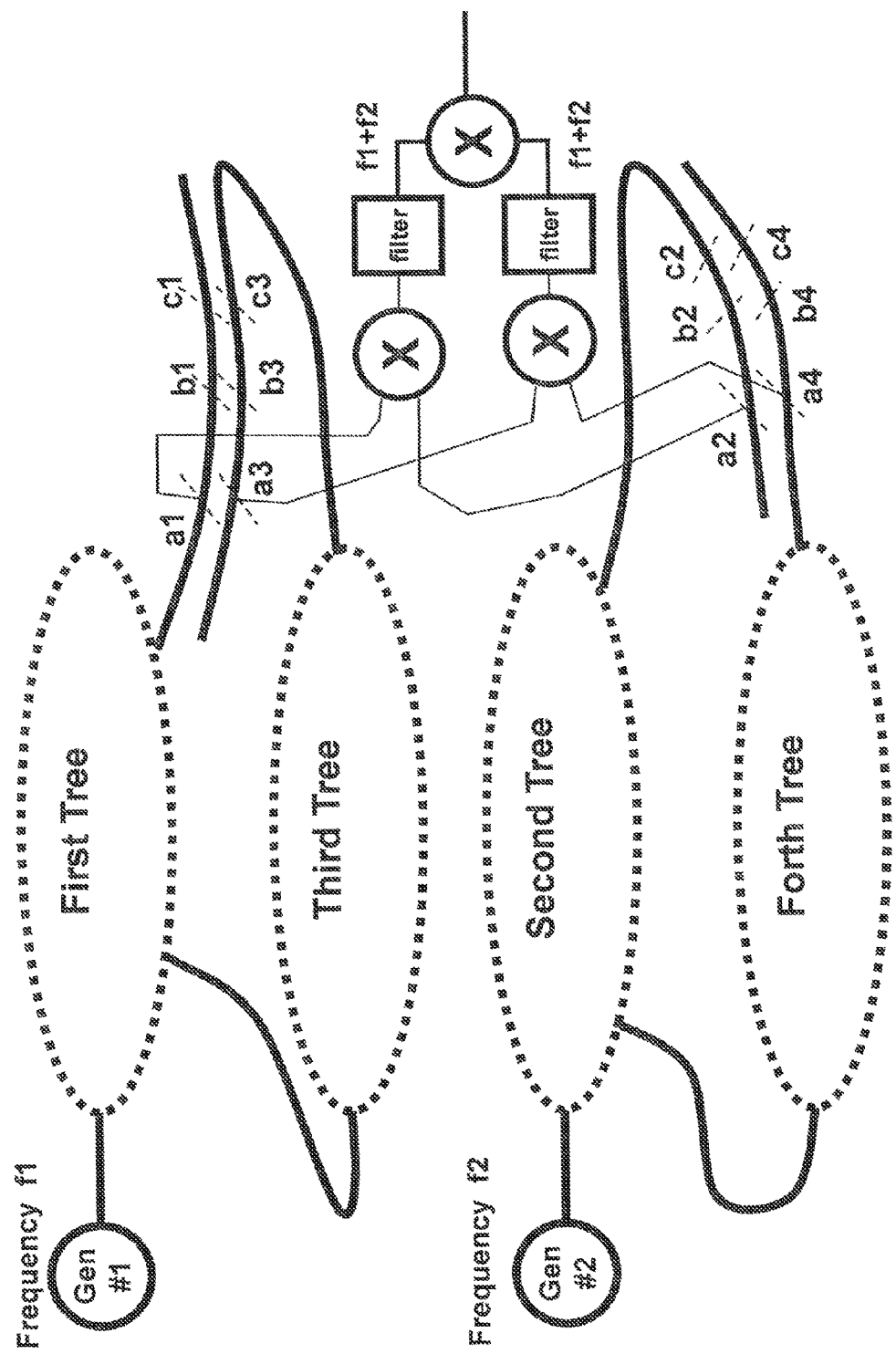
FIG. 29 depicts a schematic diagram of a two frequency system with four tree networks and two generators in accordance with an embodiment of the present invention.

The system in FIG. 26 is a variation similar to the system in FIG. 25 but using only two generators. FIG. 27 shows the Client circuit as described previously. FIGS. 28-29 show the generalization of the two-frequency concept of this invention to any trees. As before, only four branches are shown explicitly.

Additional Possibilities

Additional embodiments of this invention are contemplated where the two generators in the previous single frequency systems operate at different frequencies.

Figure 30:
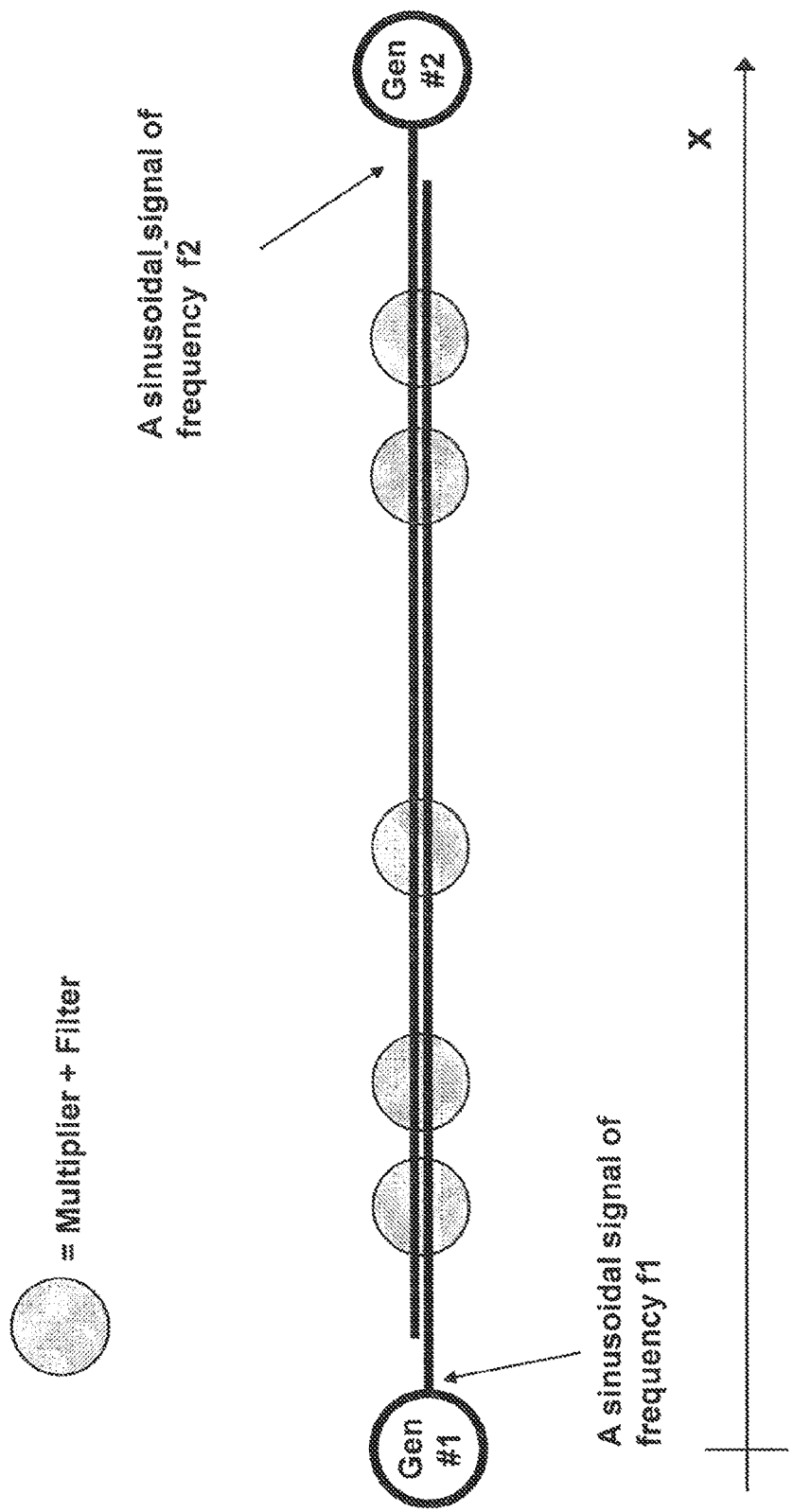
FIG. 30 depicts a schematic diagram of a two frequency system with two trunks and two generators in accordance with an embodiment of the present invention.

FIG. 30 shows the simplest example, where two tree trunks are excited by sinusoidal signals from opposite sides and the client circuits are simple analog multipliers. At any coordinate x, the signals are:

$$S1(t) = A\sin[(x/c-t)\omega 1 + \phi 1] \tag{9a}$$

$$S2(t) = A\sin[(x/c+t)\omega 2 + \phi 2] \tag{9b}$$

and multiplying these signals we get:

$$S1(t)S2(t) = (\tfrac{1}{2})A2\cos[(x/c)(\omega 1-\omega 2)-t(\omega 1+\omega 2)+(\phi 1-\phi 2)] - (\tfrac{1}{2})A2\cos[(x/c)(\omega 1+\omega 2)-t(\omega 1-\omega 2)+(\phi 1+\phi 2)] \tag{10}$$

As expected, relation (10) shows two sinusoidal components, one at frequency (f1+f2) and the other at frequency (f1−f2). Unfortunately, both components depend on the coordinate x. However, the strength of this dependence is very different for the two components: it is weak for the (f1+f2) component and strong for the (f1+f2) component. This property becomes quite pronounced if frequencies f1 and f2 are very close to each other. In the limit when f1=f2, the (f1+f2) component becomes independent of position and the (f1−f2) component becomes a DC component.

From a practical point of view, if f1 and f2 are very close, the (f1+f2) component is almost independent of position over large distances on the trunk. Therefore, such a dual frequency system may be used for synchronized-carrier generation. Naturally, the (f1−f2) component should be rejected with filters. This is not a difficult task since the (f1+f2) and (f1−f2) components are far from each other in frequency.

A different aspect of the two frequency system in FIG. 30 is the possibility of generating carriers with phase offsets, which are linear with position x. In other words, if an application such as active arrays required different clients with phase shifts changing linearly with position, the system of FIG. 30 could be used by adjusting frequencies f1 and f2 such as to obtain the desired carrier at f1+f2 and a systematic phase shift. Moreover, by changing f1 and f2 purely differentially without changing their common mode component (f1=f0+Δf, f2=f0−Δf, where f0 is the desired carrier frequency and Δf is a frequency offset) the clients could be phase shifted with respect to each other dynamically.

Figure 31:
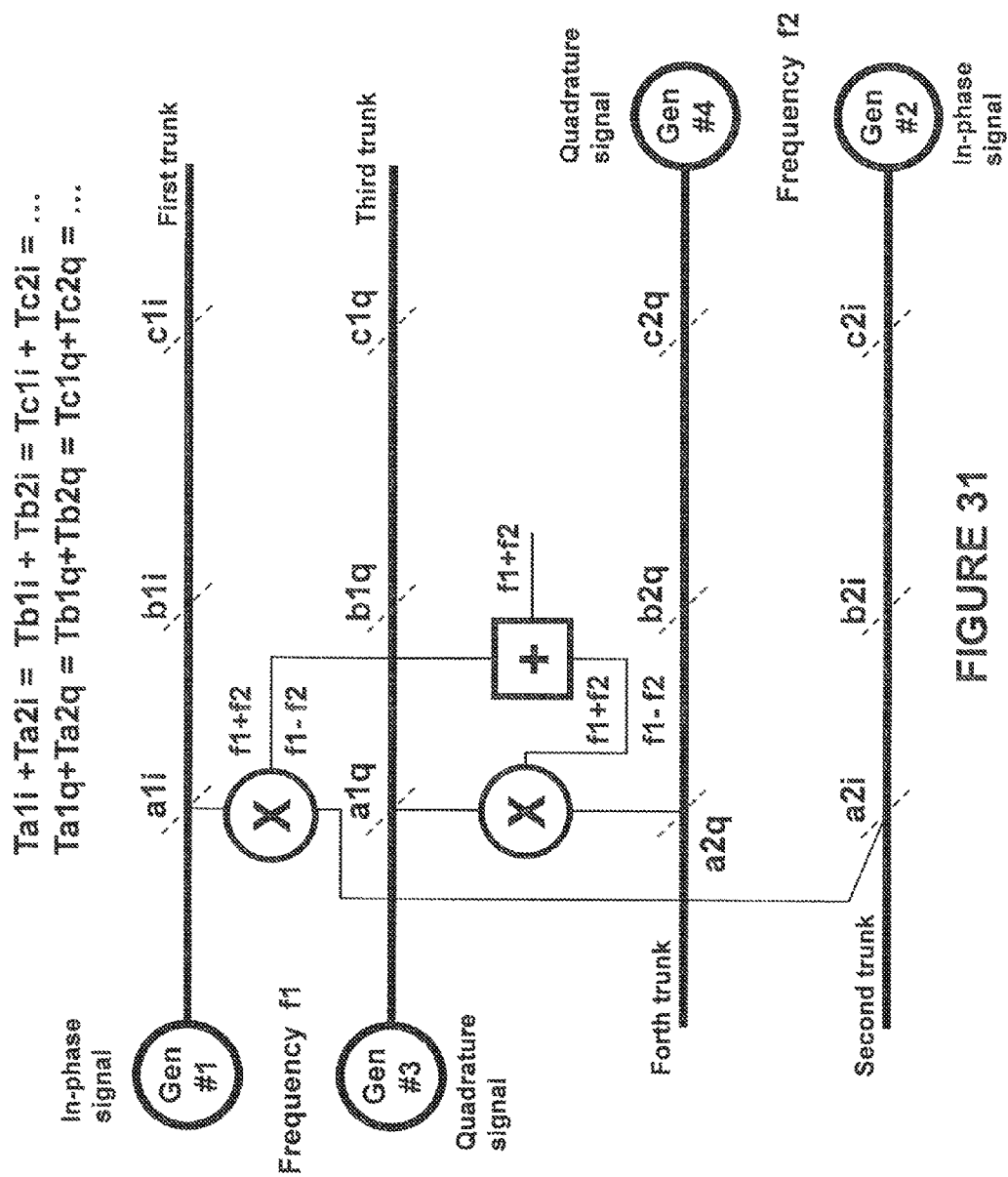
FIG. 31 depicts a schematic diagram of a two frequency I/Q system with four tree trunks and four generators in accordance with an embodiment of the present invention.

A further application of this concept is by using in-phase (I) and quadrature (Q) signals. FIG. 31 shows such a case when the trees are just trunks with no branches. The first and third trunks form an I/Q signal transmission subsystem operating at frequency f1(I and Q signals) and the second and fourth trunks form another I/Q signal transmission subsystem operating at frequency f2. The propagating speed of all signals over the trunks is assumed constant independent of frequencies f1 and f2, as before. The S-Client circuit is a combination of two multipliers and an adder. The four signals at any coordinate x are (assuming equal signal magnitudes):

$$S1(t)=A \sin [(x/c-t)\omega 1+\phi 1] \quad (11a)$$

$$S2(t)=A \sin [(x/c+t)\omega 2+\phi 2] \quad (11b)$$

$$S3(t)=A \sin [(x/c-t)\omega 1+\phi 1+\pi/2] \quad (11c)$$

$$S4(t)=A \sin [(x/c+t)\omega 2+\phi 2+\pi/2] \quad (11d)$$

Multiplying relations (11a) with (11b) and (11c) with (11d) we have:

$$S1(t)S2(t)=(\tfrac{1}{2})A^2 \cos [(x/c)(\omega 1-\omega 2)-t(\omega 1+\omega 2)+(\phi 1-\phi 2)]-(\tfrac{1}{2})A^2 \cos [(x/c)(\omega 1+\omega 2)-t(\omega 1-\omega 2)+(\phi 1+\phi 2)] \quad (12a)$$

$$S3(t)S4(t)=(\tfrac{1}{2})A^2 \cos [(x/c)(\omega 1-\omega 2)-t(\omega 1+\omega 2)+(\phi 1-\phi 2)]-(\tfrac{1}{2})A^2 \cos [(x/c)(\omega 1+\omega 2)-t(\omega 1-\omega 2)+(\phi 1+\phi 2+\pi)]=(\tfrac{1}{2})A^2 \cos [(x/c)(\omega 1-\omega 2)-t(\omega 1+\omega 2)+(\phi 1-\phi 2)]+(\tfrac{1}{2})A^2 \cos [(x/c)(\omega 1+\omega 2)-t(\omega 1-\omega 2)+(\phi 1+\phi 2)] \quad (12b)$$

By adding relations (12a) and (12b), the (f1−f2) terms cancel and we get:

$$S1(t)S2(t)+S3(t)S4(t)=A^2 \cos [(x/c)(\omega 1-\omega 2)-t(\omega 1+\omega 2)+(\phi 1-\phi 2)] \quad (13)$$

Relation (13) contains only the (f1+f2) term, therefore this I/Q system eliminates the need for filters necessary in the system of FIG. 30. In the case when f1=f2, the I/Q system eliminates the x-dependent DC terms. As before, this system can be used to generate carriers with x-dependent phase offsets.

Figure 32:
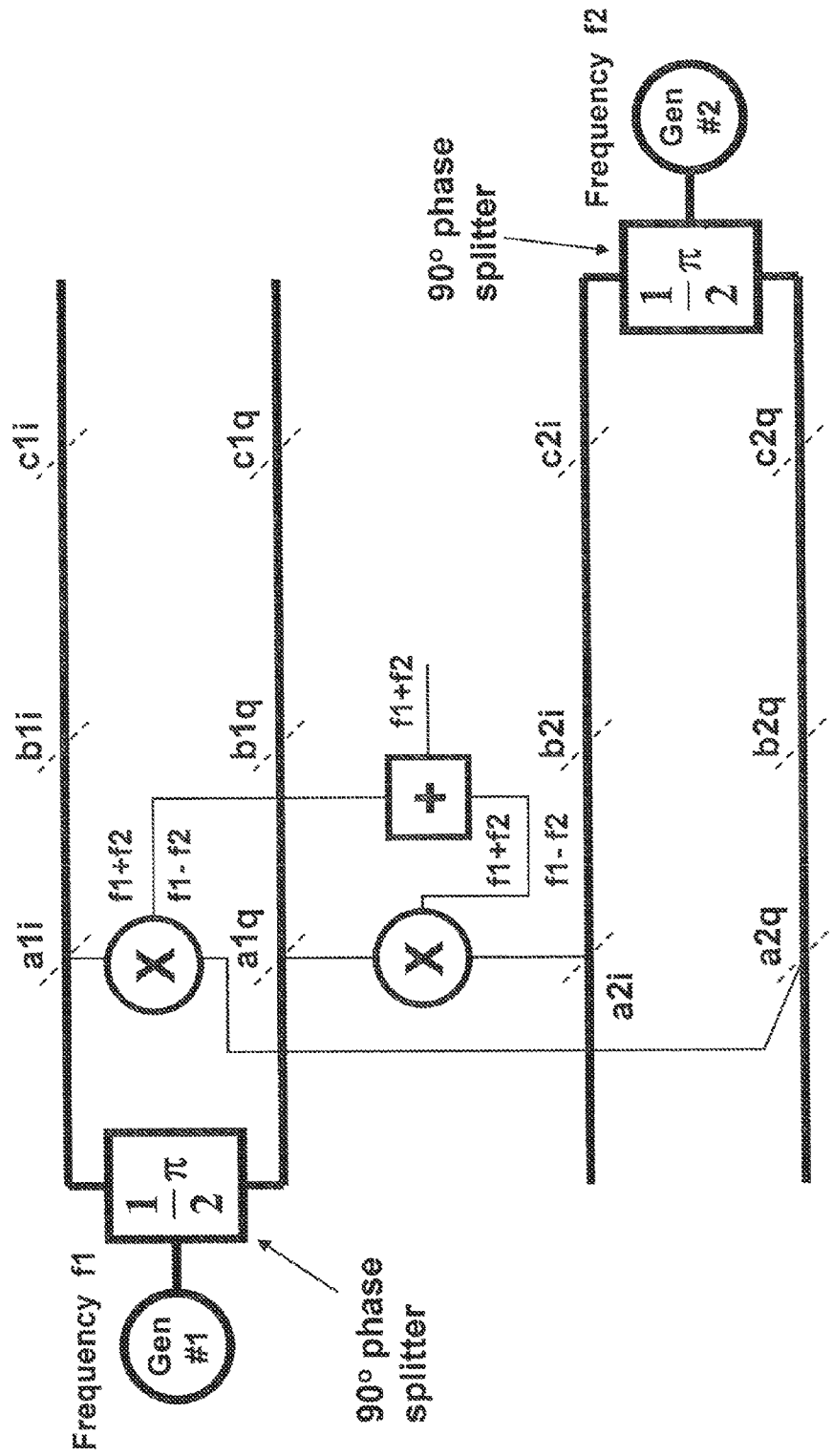
FIG. 32 depicts a schematic diagram of a two frequency I/Q system with four trunks and two generators in accordance with an embodiment of the present invention.
Figure 33:
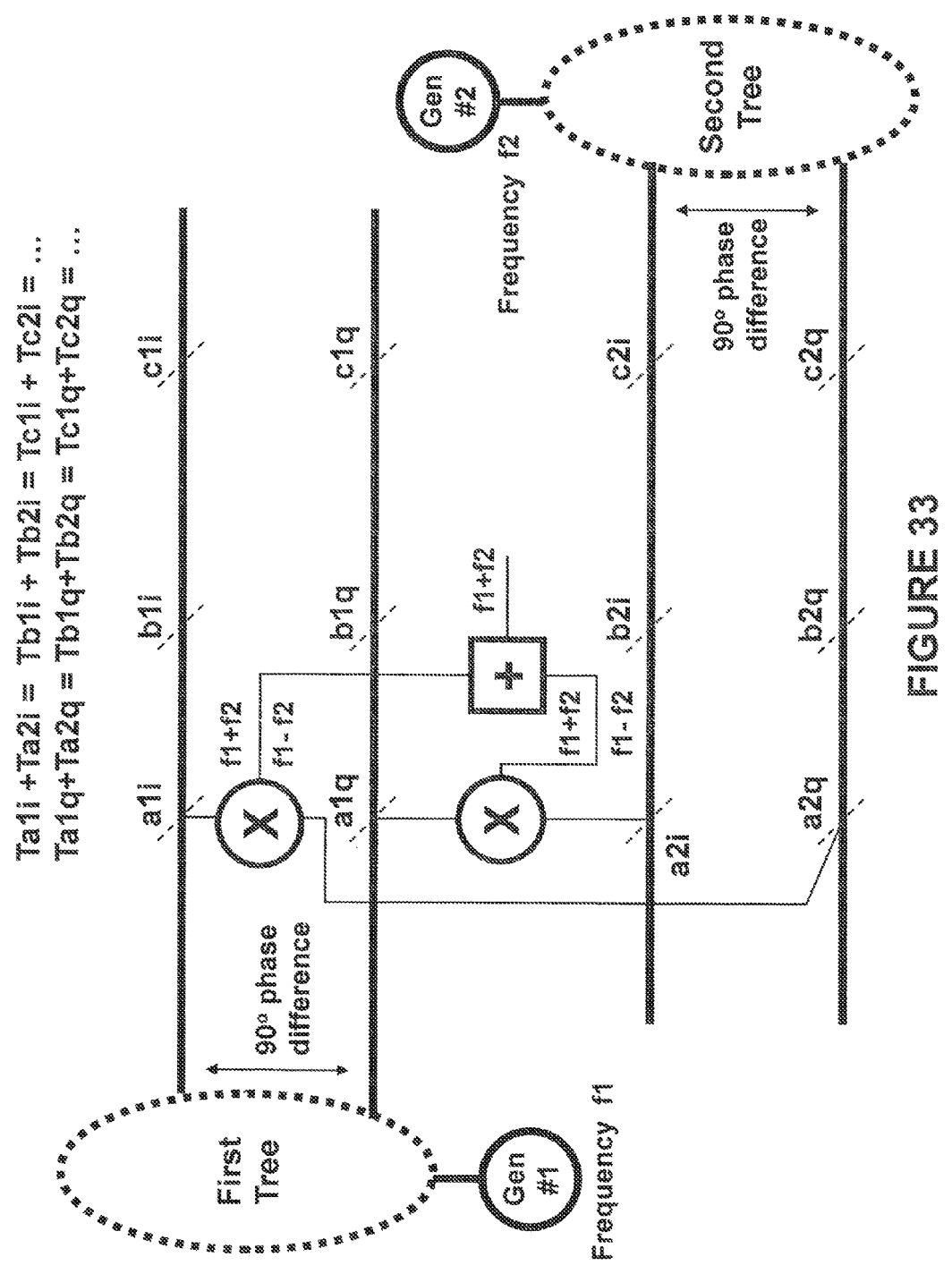
Figure 34:
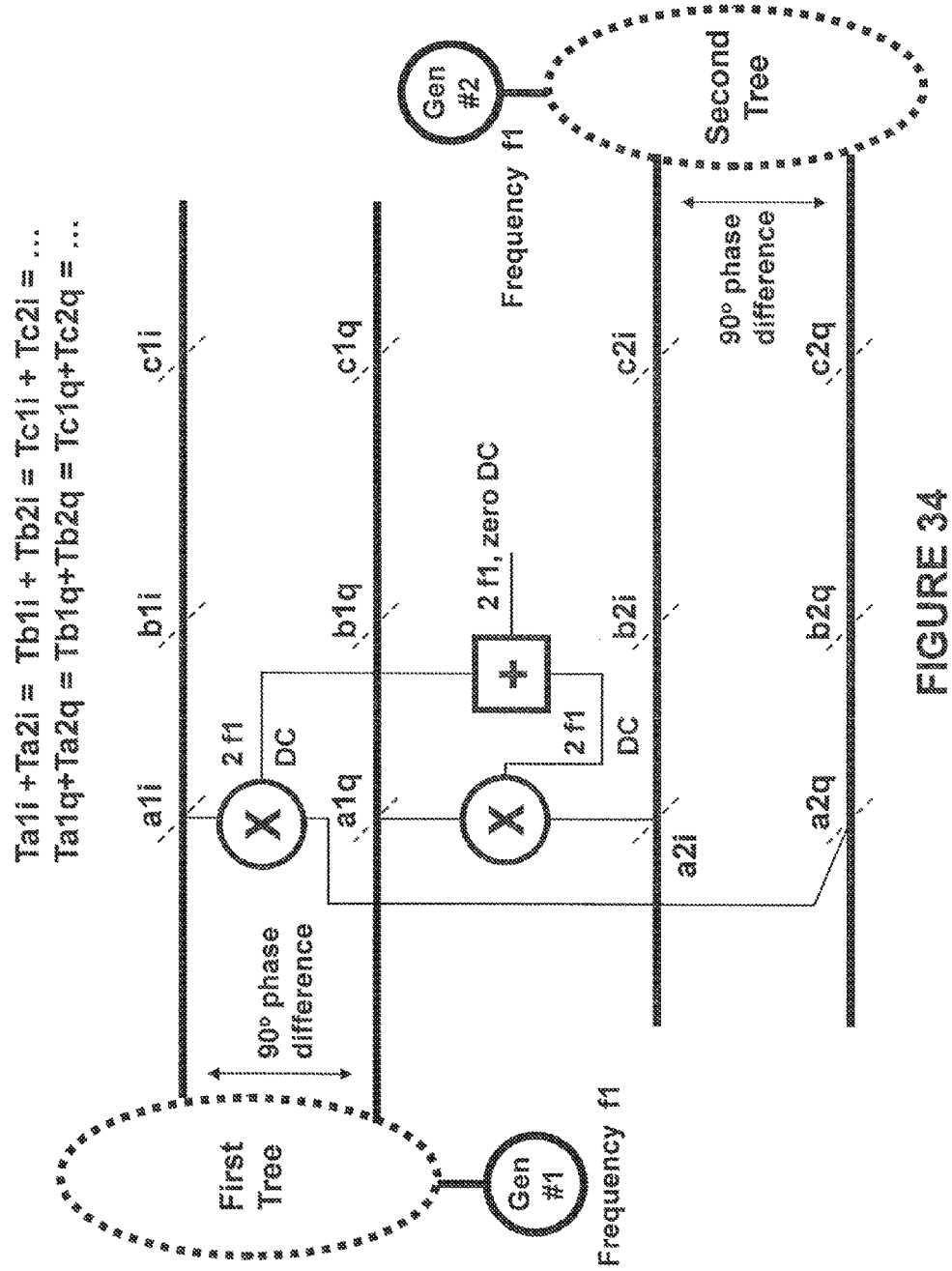
FIG. 34 depicts a schematic diagram of a single frequency I/Q system with two tree networks and two generators in accordance with an embodiment of the present invention.

FIG. 32 shows a possible variation of the I/Q system, using only two generators and I/Q phase splitters. Furthermore, this concept can be generalized to any tree topology, as in the previous cases. FIGS. 33-34 and illustrate this possibility for the cases when f1 and f2 are different and when f1=f2.

Double Conversion Systems

Figure 35:
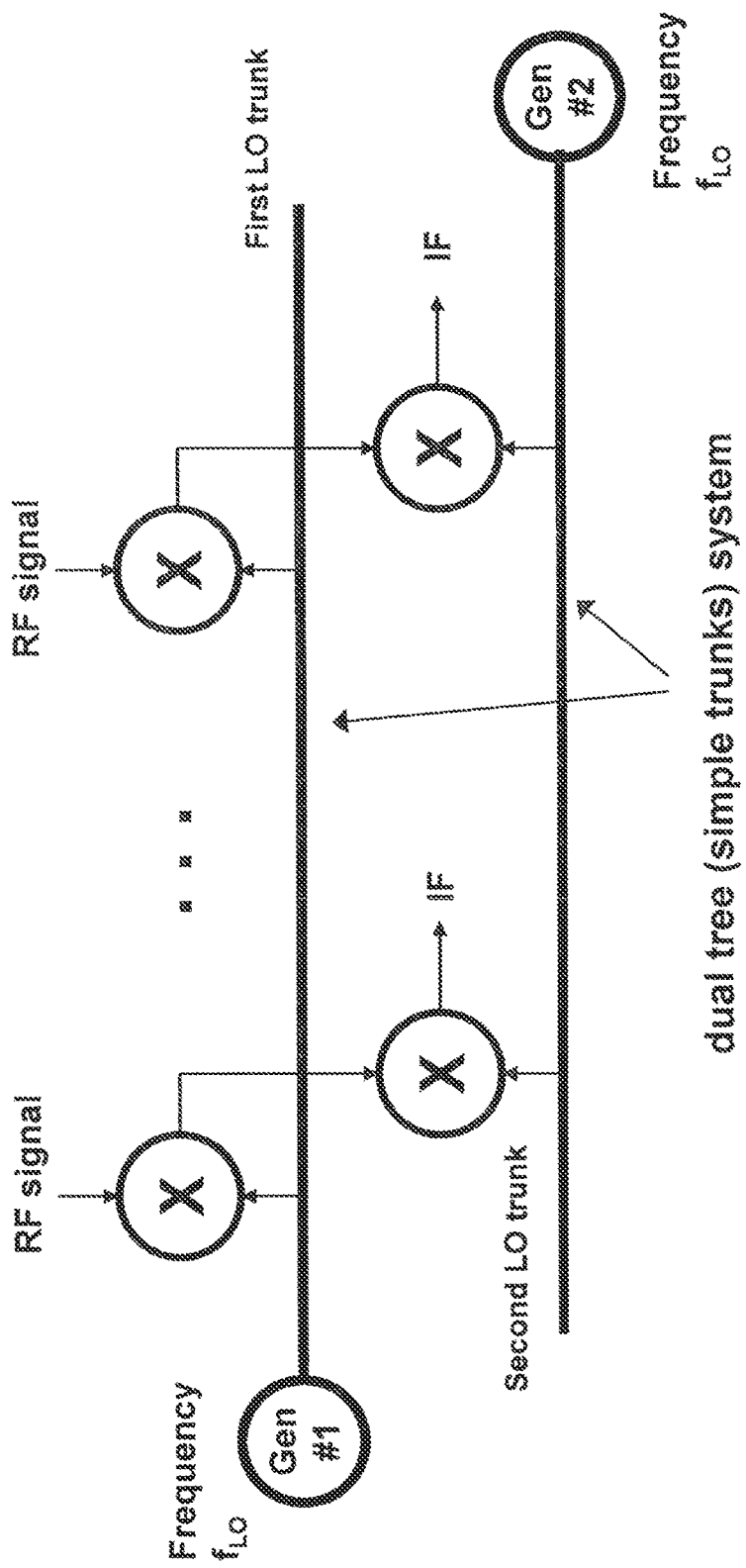
FIG. 35 depicts a schematic diagram of a double-conversion system with globally synchronized bi-directional local oscillator (LO) signals in accordance with an embodiment of the present invention.

In all previous cases, the focus has been in generating globally synchronized carrier signals or clock signals. In certain applications, such as antenna arrays, embodiments of the present invention contemplate obtaining globally synchronized frequency conversion of many RF signals without explicitly generating synchronized LO (local oscillator) signals. FIG. 35 shows such a case. Here, the RF signals are first multiplied by a first signal in a first LO trunk and the resulting signal is further multiplied by the second signal in the second LO trunk. Some filtering (not shown in FIG. 35) may be necessary. All IF signals produced are globally synchronized with respect to the original RF signals, just as if the RF signals had been mixed with a global reference. This concept is also applicable for any tree networks as in the previous cases.

The foregoing description is provided to illustrate and explain the embodiments of the present invention. However, the description hereinabove should not be considered to limit the scope of the invention set forth in the claims appended hereto.

The invention claimed is:

1. A method for generating carrier-synchronized signals, said method comprising:
applying first and second input carrier signals to first and second inputs, respectively, of a system comprising a first tree network coupled to the first input and a second tree network coupled to the second input, the first tree network having a plurality of branches and the second tree network having a plurality of branches, the system having a plurality of node pairs each of which includes a first node on a branch of the first tree network and a second node on a branch of the second tree network, each node pair of the plurality of node pairs being at a different location and wherein all node pairs of the plurality of node pairs are phase synchronous; and
for each node pair of the plurality of node pairs, processing signals of both the first and second nodes of that node pair to generate a corresponding output carrier signal, wherein the output carrier signals for the plurality of node pairs are phase synchronized.

2. The method of claim 1, wherein each node pair is characterized by a synchronization flight time, and wherein the synchronization flight times of all node pairs of the plurality of internal node pairs are substantially equal.

3. The method of claim 2, wherein the synchronization flight time for any node pair of the plurality of node pairs is a sum of the travel time of the first input carrier signal from the first input to the first node of that node pair plus the travel time of the second input carrier signal from the second input to the second node of that node pair.

4. The method of claim 1, wherein each node pair is characterized by a synchronization flight time, and wherein for each node pair of the plurality of node pairs the carrier phase of the carrier output signal for that node pair is a function of the synchronization flight time for that node pair.

5. The method of claim 1, wherein each node pair is characterized by a synchronization flight time, and wherein both of the first and second input carrier signals have a carrier frequency equal to $f_0$ with a period equal to $T_D$, and wherein the synchronization flight time of each node pair of the plurality of nodes pairs is equal to SFT±n·$T_D$, where SFT and $T_D$ are positive numbers and n is a positive integer.

6. The method of claim 5, wherein for each node pair of the plurality of node pairs the carrier phase of the output carrier signal for that node pair is a function of the synchronization flight time for that node pair.

7. The method of claim 1, wherein processing signals of each node pair of the plurality of node pairs to generate the output carrier signals for the plurality of node pairs involves, for each node pair, analog multiplying the signal of the first node of that node pair with the signal of the second node of that node pair.

8. The method of claim 1, wherein the first and second carrier signals are at different frequencies.

9. The method of claim 1, wherein the first nodes of the plurality of node pairs are located on different branches of the first tree network and wherein the second nodes of the plurality of node pairs are located on different branches of the second tree network.

10. A system for generating carrier-synchronized signals, said system comprising:
  a first tree network having a first input for receiving a first input carrier signal, the first tree network having a plurality of branches;
  a second tree network having a second input for receiving a second input carrier signal, the second tree network having a plurality of branches;
  a plurality of node pairs, each of which includes a first node on a branch of the first tree network and a second node on a branch of the second tree network, each node pair of the plurality of node pairs being at a different location and wherein all node pairs of the plurality of node pairs are phase synchronous; and
  a plurality of electronic circuits equal in number to the plurality of node pairs, each electronic circuit of the plurality of electronic circuits for processing signals of both the first and second nodes of a corresponding different node pair of the plurality of node pairs to generate a corresponding output carrier signal, wherein the output carrier signals for the plurality of node pairs are phase synchronous.

11. The system of claim 10, wherein each electronic circuit of the plurality of electronic circuits comprises an arrival time averaging circuit.

12. The system of claim 10, wherein each electronic circuit of the plurality of electronic circuits comprises a delay locked loop circuit.

13. The system of claim 10, wherein each electronic circuit of the plurality of electronic circuits comprises an analog multiplier circuit.

14. The system of claim 10, wherein each node pair is characterized by a synchronization flight time, and wherein the synchronization flight times of all node pairs of the plurality of internal node pairs are substantially equal.

15. The system of claim 14, wherein the synchronization flight time for any node pair of the plurality of node pairs is a sum of the travel time of the first input carrier signal from the first input to the first node of that node pair plus the travel time of the second input carrier signal from the second input to the second node of that node pair.

16. The system of claim 10, wherein each node pair is characterized by a synchronization flight time, and wherein for each node pair of the plurality of node pairs the carrier phase of the output carrier signal for that node pair is a function of the synchronization flight time for that node pair.

17. The system of claim 10, wherein each node pair is characterized by a synchronization flight time, and wherein both of the first and second input carrier signals have a carrier frequency equal to $f_0$ with a period equal to $T_D$, and wherein the synchronization flight time of each node pair of the plurality of nodes pairs is equal to $SFT \pm n \cdot T_D$, where SFT and $T_D$ are positive numbers and n is a positive integer.

18. The system of claim 17, wherein for each node pair of the plurality of node pairs the carrier phase of the carrier output signal for that node pair is a function of the synchronization flight time for that node pair.

19. The system of claim 10, further comprising a first signal source for providing the first input carrier signal and a second signal source for providing the second input carrier signal, wherein the first and second input carrier signals are at different frequencies.

20. The system of claim 10, wherein the first nodes of the plurality of node pairs are located on different branches of the first tree network and wherein the second nodes of the plurality of node pairs are located on different branches of the second tree network.

21. The system of claim 10, wherein the first and second tree networks are each TL-tree networks.

22. A method for generating carrier-synchronized signals, said method comprising:
  applying first and second input carrier signals to first and second inputs, respectively, of a system comprising a first network coupled to the first input and a second network coupled to the second input, at least one of the first and second carrier signals being modulated, the system having a plurality of node pairs each of which includes a first node on the first network and a second node on the second network, each node pair of the plurality of node pairs being at a different location and wherein all of the node pairs of the plurality of node pairs are phase synchronous; and
  for each node pair of the plurality of node pairs, processing signals of both the first and second nodes of that pair to generate a corresponding modulated output carrier signal, wherein the modulate output carrier signals for the plurality of node pairs are phase synchronized.

23. The method of claim 22, wherein both of the first and second input carrier signals are modulated.

24. The method of claim 22, wherein the first network is a first tree network with a plurality of branches and wherein the first nodes of the plurality of node pairs are located on multiple branches of the first tree network and wherein the second network is a second tree network with a plurality of branches and wherein the second nodes of the plurality of node pairs are located on multiple branches of the second tree network.

25. The method of claim 22, wherein each node pair is characterized by a synchronization flight time, and wherein the synchronization flight times of all node pairs of the plurality of internal node pairs are substantially equal.

26. The method of claim 22, wherein each node pair is characterized by a synchronization flight time, and wherein for each node pair of the plurality of node pairs the carrier phase of the carrier output signal for that node pair is a function of the synchronization flight time for that node pair.

27. The method of claim 22, wherein each node pair is characterized by a synchronization flight time, and wherein both of the first and second input carrier signals have a carrier frequency equal to $f_0$ with a period equal to $T_D$, and wherein the synchronization flight time of each node pair of the plurality of nodes pairs is equal to $SFT \pm n \cdot T_D$, where SFT and $T_D$ are positive numbers and n is a positive integer.

28. The method of claim 27, wherein for each node pair of the plurality of node pairs the carrier phase of the carrier output signal for that node pair is a function of the synchronization flight time for that node pair.

29. A system for generating carrier-synchronized signals, said system comprising:
- a first network with a first input for receiving a first input carrier signal;
- a second network with a second input for receiving a second input carrier signal;
- a first source providing the first input carrier signal to the first input;
- a second source providing the second input carrier signal to the second input, wherein at least one of the first and second carrier signals is modulated;
- a plurality of node pairs, each of which includes a first node on the first network and a second node on the second network, each node pair of the plurality of node pairs being at a different location, and wherein all of the node pairs of the plurality of node pairs are phase synchronous; and
- a plurality of electronic circuits, each for processing signals of both the first and second nodes of a corresponding different node pair of the plurality of node pairs to generate a corresponding output carrier signal, wherein the output carrier signals for the plurality of node pairs are phase synchronized.

30. The system of claim 29, wherein both of the first and second carrier signals are modulated.

31. The system of claim 29, wherein the first network is a first tree network with a plurality of branches and wherein the first nodes of the plurality of node pairs are located on multiple branches of the first tree network and wherein the second network is a second tree network with a plurality of branches and wherein the second nodes of the plurality of node pairs are located on multiple branches of the second tree network.

32. The system of claim 29, wherein each node pair is characterized by a synchronization flight time, and wherein the synchronization flight times of all node pairs of the plurality of node pairs are substantially equal.

33. The system of claim 29, wherein each node pair is characterized by a synchronization flight time, and wherein for each node pair of the plurality of node pairs the carrier phase of the carrier output signal for that node pair is a function of the synchronization flight time for that node pair.

34. The system of claim 29, wherein each node pair is characterized by a synchronization flight time, and wherein both of the first and second input carrier signals have a carrier frequency equal to $f_0$ with a period equal to $T_D$, and wherein the synchronization flight time of each node pair of the plurality of nodes pairs is equal to $SFT \pm n \cdot T_D$, where SFT and $T_D$ are positive numbers and n is a positive integer.

35. The system of claim 34, wherein for each node pair of the plurality of node pairs the carrier phase of the carrier output signal for that node pair is a function of the synchronization flight time for that node pair.

* * * * *